US009785186B2

(12) United States Patent
Gregg et al.

(10) Patent No.: US 9,785,186 B2
(45) Date of Patent: Oct. 10, 2017

(54) PACKAGE SYSTEM WITH COVER STRUCTURE AND METHOD OF OPERATION THEREOF

(71) Applicant: Samsung Electronics Co., Ltd., Gyeonggi-Do (KR)

(72) Inventors: Justin L. Gregg, Golden, CO (US); Michael Rosenblatt, Boulder, CO (US); Alejandro Enrique Vallejo, Daly City, CA (US); Roberto M. Aimi, Portland, OR (US); Jeff Beene, San Francisco, CA (US); Ji-Yeon Lee, Mountain View, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 627 days.

(21) Appl. No.: 14/055,549

(22) Filed: Oct. 16, 2013

(65) Prior Publication Data

US 2014/0118908 A1 May 1, 2014

Related U.S. Application Data

(60) Provisional application No. 61/714,698, filed on Oct. 16, 2012, provisional application No. 61/715,240, filed on Oct. 17, 2012, provisional application No. 61/717,038, filed on Oct. 22, 2012, provisional application No. 61/724,865, filed on Nov. 9, 2012, provisional application No. 61/725,975, filed on Nov. 13, 2012, provisional application No. 61/727,620, filed on Nov. 16, 2012.

(51) Int. Cl.
G06F 1/16 (2006.01)
H04M 1/02 (2006.01)

(52) U.S. Cl.
CPC ....... *G06F 1/1601* (2013.01); *Y10T 29/49002* (2015.01)

(58) Field of Classification Search
CPC ............ A45C 2011/002; H04B 1/3833; H04B 1/3888; G06F 1/1626; H04M 1/0283; H04M 1/0214; H04M 1/23; H04M 1/0247; H04M 1/0237; H04M 1/18
See application file for complete search history.

(56) References Cited

U.S. PATENT DOCUMENTS

| 5,397,918 | A | 3/1995 | Yokochi et al. |
| 5,574,314 | A | 11/1996 | Okada |
| 5,657,997 | A | 8/1997 | Luhrsen |
| 5,923,083 | A | 7/1999 | Autry et al. |
| 7,595,983 | B2 * | 9/2009 | Okuda .............. G02F 1/133308 313/582 |
| 8,159,311 | B2 | 4/2012 | Takagi |
| 8,406,827 | B2 | 3/2013 | Liu |
| 8,481,126 | B2 | 7/2013 | Wang et al. |

(Continued)

FOREIGN PATENT DOCUMENTS

| CN | 101784174 A | 7/2010 |
| CN | 201987114 U | 9/2011 |

(Continued)

*Primary Examiner* — Xanthia C Cunningham
(74) *Attorney, Agent, or Firm* — IP Investment Law Group

(57) ABSTRACT

A package system includes: an exostructure; a ceramic panel attached to the exostructure; and an internal device component housed in the exostructure.

20 Claims, 18 Drawing Sheets

(56) References Cited

U.S. PATENT DOCUMENTS

| | | | |
|---|---|---|---|
| 8,755,852 B2* | 6/2014 | Hynecek | A45C 11/00 455/575.8 |
| 2006/0061859 A1* | 3/2006 | Chen | G02F 1/133308 359/443 |
| 2006/0260840 A1 | 11/2006 | Kim | |
| 2008/0039161 A1 | 2/2008 | Chan | |
| 2008/0094787 A1* | 4/2008 | Kabeya | G06F 1/1613 361/679.01 |
| 2008/0124601 A1 | 5/2008 | Ohmori et al. | |
| 2008/0227504 A1 | 9/2008 | Chan | |
| 2010/0053861 A1* | 3/2010 | Kim | H04M 1/236 361/679.01 |
| 2010/0060373 A1 | 3/2010 | Takagi | |
| 2011/0183091 A1 | 7/2011 | Zhu | |
| 2011/0261510 A1* | 10/2011 | Liu | G06F 1/1637 361/679.01 |
| 2011/0287812 A1* | 11/2011 | Joo | H04M 1/185 455/566 |
| 2012/0040136 A1 | 2/2012 | Du | |
| 2012/0106063 A1* | 5/2012 | Mathew | G02F 1/133528 361/679.21 |
| 2012/0212890 A1 | 8/2012 | Hoshino | |
| 2012/0229961 A1 | 9/2012 | Zhu et al. | |
| 2013/0108813 A1 | 5/2013 | Zhu et al. | |
| 2014/0116897 A1* | 5/2014 | Wilkey | H04B 1/3888 206/37 |

FOREIGN PATENT DOCUMENTS

| | | | |
|---|---|---|---|
| JP | 08139216 A | 5/1996 | |
| JP | 11008332 A | 1/1999 | |
| KR | 1020110127483 | * 11/2011 | H04B 1/38 |

* cited by examiner

PACKAGE SYSTEM WITH COVER STRUCTURE AND METHOD OF OPERATION THEREOF

CROSS-REFERENCE TO RELATED APPLICATION(S)

This application claims the benefit of U.S. Provisional Patent Application Ser. No. 61/727,620 filed Nov. 16, 2012, U.S. Provisional Patent Application Ser. No. 61/725,975 filed Nov. 13, 2012, U.S. Provisional Patent Application Ser. No. 61/724,865 filed Nov. 9, 2012, U.S. Provisional Patent Application Ser. No. 61/717,038 filed Oct. 22, 2012, U.S. Provisional Patent Application Ser. No. 61/715,240 filed Oct. 17, 2012, U.S. Provisional Patent Application Ser. No. 61/714,698 filed Oct. 16, 2012, and the subject matter thereof is incorporated herein by reference thereto.

TECHNICAL FIELD

An embodiment of the present invention relates generally to a package system, and more particularly to a system for packaging with a cover.

BACKGROUND

Modern consumer and industrial electronics, especially devices such as cellular phones, portable digital assistants, graphical display systems, televisions, projectors, and combination devices, are providing increasing levels of functionality to support modern life. Research and development in the existing technologies can take many different directions.

The use of novel materials in consumer products can be a driving factor for changes in a product's industrial design. The product's industrial design can benefit from aesthetics and tactile qualities as well as functional qualities including strength and durability.

By creating a structure which incorporates components and materials for their favorable aesthetic, tactile, and mechanical qualities, and combining these components to have complimentary qualities, it is possible to build a device housing which has robust reliability, while still maintaining an appropriate weight, aesthetic, and tactile qualities.

Thus, a need still remains for a package system with a novel cover structure preferably providing aesthetics, tactile qualities, and durability. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a package system including: an exostructure; a ceramic panel attached to the exostructure; and an internal device component housed in the exostructure.

An embodiment of the present invention provides a method of manufacture of a package system including: providing an exostructure; attaching a ceramic panel to the exostructure; and housing an internal device component in the exostructure.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
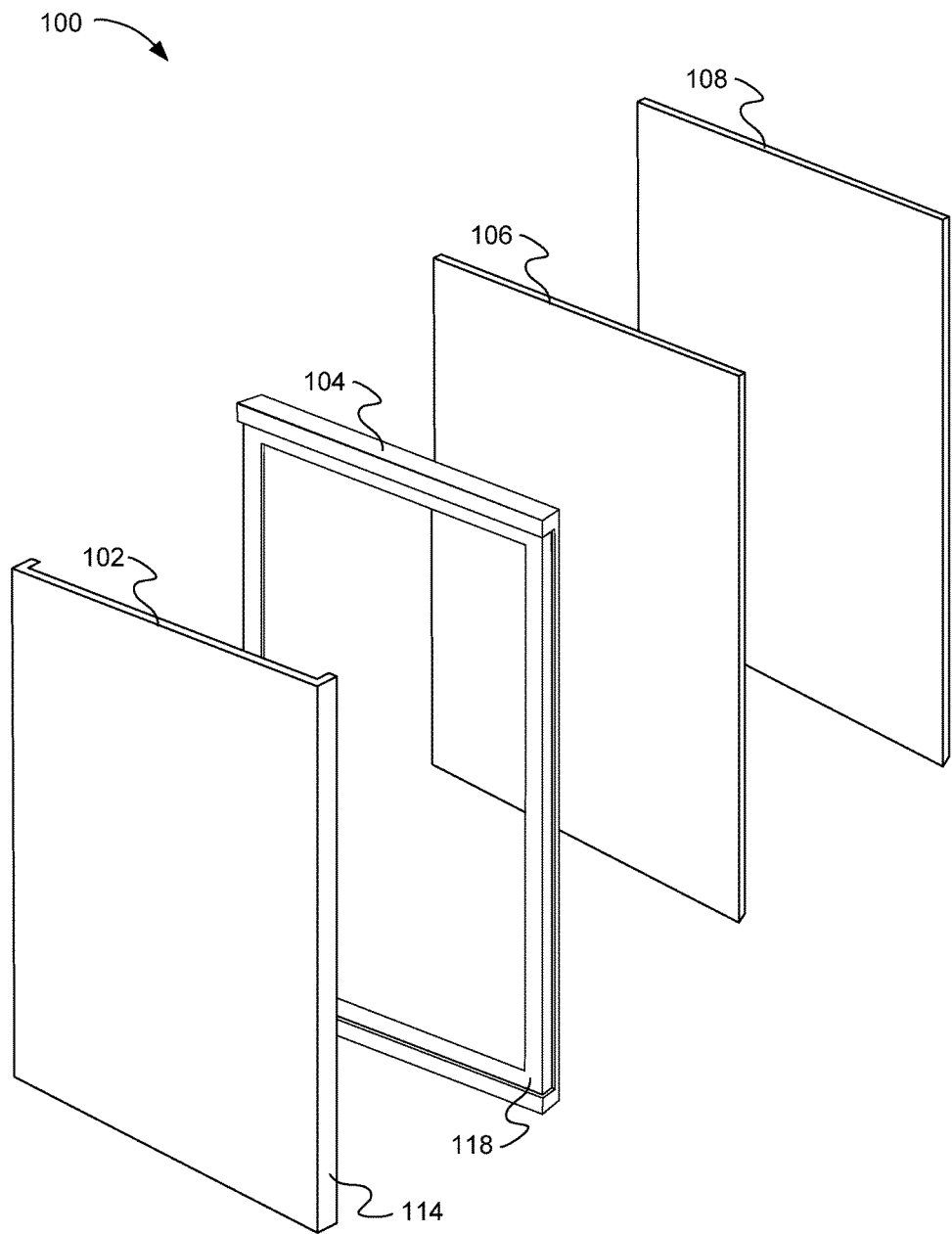
FIG. 1 is an expanded view of a package system with cover structure in an embodiment of the present invention.

The use of novel materials in consumer products is often the driving factor for changes in a product's industrial design. Ceramics have proven to be a difficult material to integrate into hand held electronics because of their brittle and often fragile nature, when related to their drop reliability. However, ceramics provide an aesthetic and tactile quality along with high compressive strength that cannot be replicated or substituted with different materials.

In an embodiment of the present invention a structure can be created which incorporates ceramic components for their favorable aesthetic, tactile, and material qualities. Using other materials to provide qualities that favorably complement those of ceramics, it is possible to build a device housing which has robust drop reliability, while still maintaining an appropriate weight, and the aesthetic and tactile qualities of a mostly ceramic assembly.

In an embodiment of the present invention a more robust and potentially realistic housing architecture is based around the extensive use of ceramic materials for the housing of a hand held computing device. This contrast with using a 'monolithic' housing, which is comprised of a single ceramic component, with limited, non-structural supporting components that are added for assembly purposes.

In an embodiment of the present invention the use of non-ceramic components serves very specific and necessary structural purposes that address the inherent limitations of using an all ceramic housing with respect to the robustness of such a device when dropped. The ceramic component provides the majority of the structural rigidity (torsional rigidity, bending moments resistance, etc.) but is prevented from being the component of the handset which is in initial contact with any impact plane by the non-ceramic exostructure.

Ceramic materials are by their nature, very hard, brittle, and can sustain very little tensile strain before rupture, and exhibit no substantial plastic deformation before failure. Ceramics do, however, have very high compressive strengths, which can exceed the compressive strengths of many other materials by an order of magnitude. The ceramic materials can also provide a surface or section that is hard, wear-resistant, insulating, non-magnetic, oxidation resistant, and chemically stable.

In an embodiment of the present invention, placing non-ceramic components around the edge of the main ceramic component reduced the peak impact load and increased the overall duration of the impact pulse. The goal being to reduce any bending moments created in the ceramic component to below the critical level. However, the ceramic component is still providing the majority of the shear strength, and is the main structural component of the assembly.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similar, although the views in the drawings for ease of description generally show similar orientations, this depiction in the figures is arbitrary for the most part. Generally, the invention can be operated in any orientation. The embodiments can be numbered as a matter of descriptive convenience and the numbering is not intended to have any other significance or provide limitations for an embodiment of the present invention.

Referring now to FIG. 1, therein is shown an expanded view of a package system 100 with cover structure in an embodiment of the present invention. The package system 100 includes a panel 102, which can be a ceramic panel 102 or a flanged ceramic panel 102, an exostructure 104, which can be a non-ceramic exostructure 104, a shear panel 106, and a cover 108, which can be a cover glass 108.

The ceramic panel 102 can be formed with a sintering process to improve durability through more uniform densification. The sintering process can include moving or sliding fixtures, which can include refractory materials as well as interlocking or interleaving fixture features. The moving fixtures with refractory material can eliminate the need for sacrificial materials to control a shape and dimensional tolerances for the ceramic panel 102. The moving or sliding fixtures provide significantly improved quality and fabrication simplification including eliminating post sintering processes.

The ceramic panel 102 can include a glaze, which can be applied with dipping, painting, spraying, other application processes, or combination thereof. Applying the glaze can require firing, densifying, sintering, or combination thereof. The glaze of the ceramic panel 102 can provide protection including from galling. Damage to the ceramic panel 102 can also be minimized by damping of impact vibration. The damping of vibration can be passive or active, which can include electronic circuitry.

The panel 102 can include a panel extended side 114 such as a flange 114. The panel extended side 114 can extend or protrude on opposite edges of the panel 102 forming a partial flange panel 102. For illustrative purposes the panel extended side 114 is shown with a planar surface extending orthogonally from the panel 102 although it is understood that the panel extended side 114 may have any angle, shape, size, or configuration.

For example, the package system 100 can be assembled from the outside of the housing with the ceramic panel 102 attached or fastened to a shelved cutout 118 on the exostructure 104. The shear panel 106 can provide torsional support or integrity for the packaging system, and the glass cover 108, which can be load bearing or non-load bearing, can provide protection for device components of a device such as a handset.

For illustrative purposes the panel 102, the exostructure 104, the shear panel 106, and the cover 108 are shown with planar surfaces although it is understood that they may be different. For example, the exostructure 104, the shear panel 106, the cover 108, or combination thereof can include shape features, such as openings or cutouts, for buttons, connectors, optics, sensors, other functions, or combination thereof.

The panel 102 can be substantially the same size as a device such as a hand held computing device providing a robust housing architecture based around the extensive use of ceramic materials for the housing of a hand held computing device. The package system 100 can provides a more robust and potentially realistic housing architecture based around the extensive use of ceramic materials for the housing of a hand held computing device.

The exostructure 104 can use non-ceramic components for structural integrity to address limitations including inherent limitations of a ceramic housing including robustness of the device when dropped. The exostructure 104 can prevent the panel 102 from initial contact with any impact plane. The panel 102 provides structural rigidity including torsional rigidity, bending moments resistance, etc.

The package system 100 can include the non-ceramic exostructure 104 constructed such that any flat plane such as an impact plane coming in contact with the handset will always intersect the exostructure 104 first before contacting or preventing contact with the panel 102. The ceramic panel 102 can be mechanically fastened to the exostructure 104 providing a rigid integrated assembly. The fastening can include adhesives, friction fit, interference fit, fasteners, other methods of mechanical fixation, or combination thereof.

The exostructure 104 protrudes or extends at least a sufficient offset outside or beyond the ceramic panel 102 to restrict contact with the ceramic panel 102 and the impact plane during an impact event. An offset or thickness of the exostructure 104 to the ceramic panel 102 can be 0.5 mm to 1.0 mm with the exostructure 104 having an effective Young's modulus of 50 to 100 GPa.

Other combinations of the offset and Young's modulus with higher values can increase overall shock to the packaging system 100, and lower values can result in undue deformation of the integrated assembly. For example, decreasing the effective Young's modulus can decrease the offset or gap for the ceramic panel 102 with the impact plane.

A large decrease in the effective Young's modulus can result in a large deformation of the exostructure 104 during the impact event. The large deformation of the exostructure 104 can result in the ceramic panel 102 rapidly contacting the impact plane, which could cause structure failure of the ceramic panel 102.

For example, the packaging system 100 can provide hand held computing devices with aesthetic and tactile qualities of ceramic components, and robust drop performance. Thus the packaging system 100 can survive mechanical rigors of a hand held computing device, such as being dropped from typical ear height.

For illustrative purposes example embodiments of the present invention are shown with rectangular shapes, or shapes with orthogonal or straight sides, however it is understood that the sides may be of any shape or configuration. As an example, this technology can be implemented with an assembly with curved sides, sloping sides, shaped sides, or combination thereof.

It has been discovered that the package system 100 can restrict contact with the ceramic panel 102 and the impact plane during an impact event. The exostructure 104 can contact the impact plane first before the impact plane contacts the panel 102.

It has also been discovered that the package system 100 with the exostructure 104 can include an offset and an effective Young's modulus to restrict contact with the panel 102 and the impact plane. The combination of the offset and the Young's modulus can prevent undue deformation in the integrated assembly of the exostructure 104 and panel 102.

Figure 2:
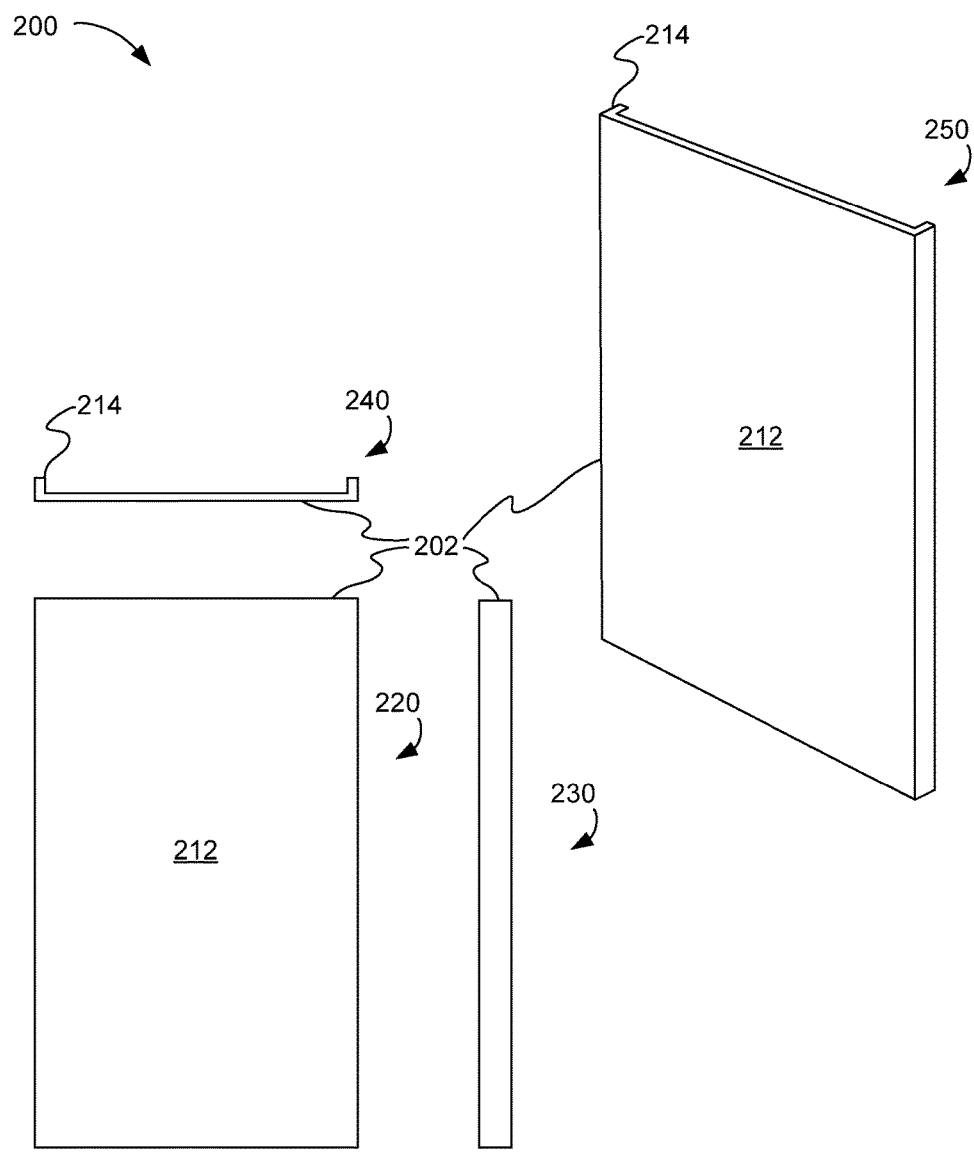
FIG. 2 is alternate views of a component of a package system with cover structure in an embodiment of the present invention.

Referring now to FIG. 2, therein is shown alternate views of a component of a package system 200 with cover structure in an embodiment of the present invention. Similar to the package system 100 of FIG. 1, the package system 200 includes a panel 202, which can be a ceramic panel 202. The panel 202 can include a panel first side 212 and a panel extended side 214.

Panel extended sides 214 can protrude orthogonally from opposite edges of the first side 212 forming a partial flange panel 202. For illustrative purposes, the panel extended side 214 is shown with a planar surface orthogonal to the first side 212 although it is understood that the panel extended side 214 may be of any angle, shape, size, or configuration.

The panel 202 is shown in a plan view 220. For illustrative purposes, the plan view 220 of the panel 202 is shown with a planar surface although it is understood that it may be different. For example, the panel 202 may be of any shape or configuration and can include any shape feature.

The panel 202 is shown in a side view 230. For illustrative purposes, the side view 230 of the panel 202 is shown with a planar surface although it is understood that it may be different. For example, the panel 202 may be of any shape or configuration and can include any shape feature.

The panel 202 is shown in a top view 240. For illustrative purposes, the front view 240 of the panel 202 is shown with a planar surface although it is understood that it may be different. For example, the panel 202 may be of any shape or configuration and can include any shape feature.

The panel 202 is shown in an isometric view 250. For illustrative purposes, the front view 250 of the panel 202 is shown with a planar surface although it is understood that it may be different. For example, the panel 202 may be of any shape or configuration and can include any shape feature.

Figure 3:
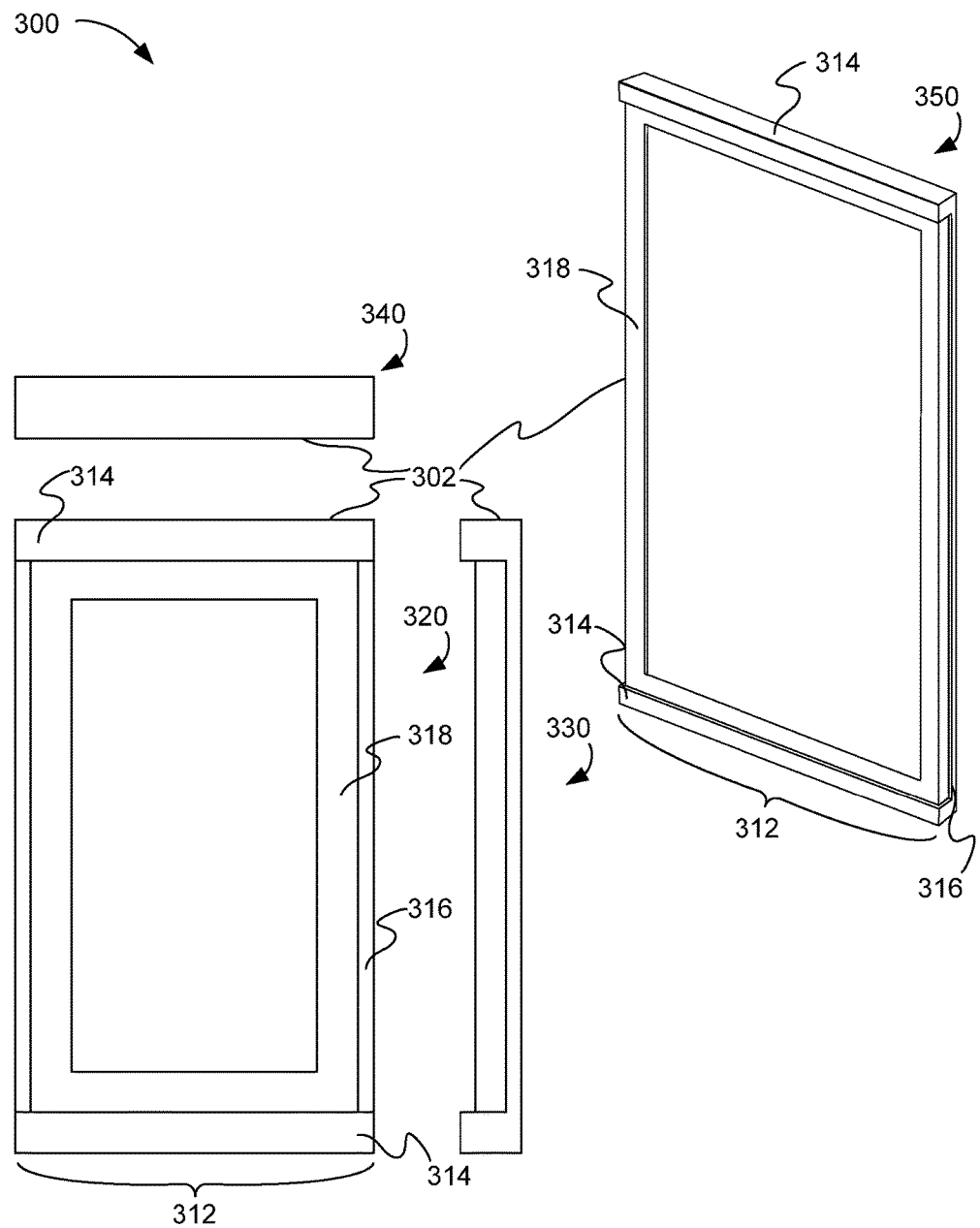
FIG. 3 is alternate views of a component of a package system with cover structure in an embodiment of the present invention.

Referring now to FIG. 3, therein is shown alternate views of a component of a package system 300 with cover structure in an embodiment of the present invention. Similar to the package system 100 of FIG. 1, the package system 300 includes an exostructure 304 such as a non-ceramic exostructure 304. The exostructure 304 can include a first side 312, an exostructure extended side 314, a recessed section 316, and a shelved cutout 318.

Exostructure extended sides 314 can protrude orthogonally from opposite edges of the first side 312. For illustrative purposes, the exostructure extended side 314 is shown with a planar surface orthogonal to the first side 312 although it is understood that it may be of any shape, size, or configuration.

The first side 312 can include recessed sections 316 on opposite sides of the first side 312. The recessed sections 316 can be offset from the shelved cutout 318 in a direction opposite and on sides adjacent the exostructure extended sides 314.

For example, the exostructure extended side 314 on an upper side and a lower side of the exostructure 304 can create a shape of a step up from the shelved cutout 318, and the recessed sections 316 on a left side and a right side of the exostructure 304 can create a shape of a step down from the shelved cutout 318.

The exostructure 304 is shown in a plan view 320. For illustrative purposes, the plan view 320 of the exostructure 304 is shown with a planar surface although it is understood that it may be different. For example, the exostructure 304 may be of any shape or configuration and can include any shape feature.

The exostructure 304 is shown in a side view 330. For illustrative purposes, the side view 330 of the exostructure 304 is shown with a planar surface although it is understood that it may be different. For example, the exostructure 304 may be of any shape or configuration and can include any shape feature.

The exostructure 304 is shown in a top view 340. For illustrative purposes, the top view 340 of the exostructure 304 is shown with a planar surface although it is understood that it may be different. For example, the exostructure 304 may be of any shape or configuration and can include any shape feature.

The exostructure 304 is shown in an isometric view 350. For illustrative purposes, the isometric view 350 of the exostructure 304 is shown with a planar surface although it is understood that it may be different. For example, the exostructure 304 may be of any shape or configuration and can include any shape feature.

Figure 4:
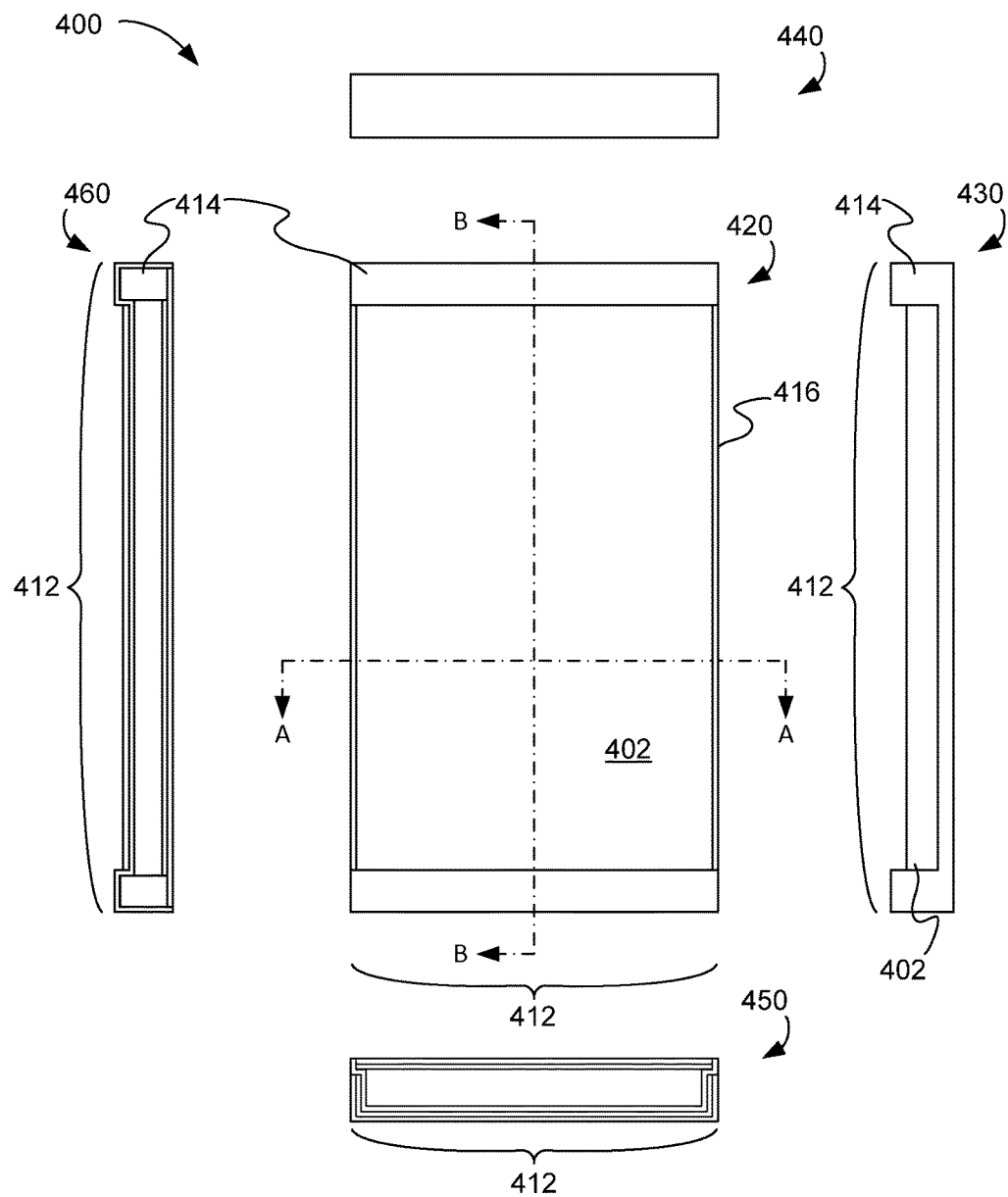
FIG. 4 is alternate views of a package system with cover structure in an embodiment of the present invention.

Referring now to FIG. 4, therein is shown alternate views of a package system 400 with cover structure in an embodiment of the present invention. Similar to the package system 100 of FIG. 1, the package system 400 includes a panel 402, which can be a ceramic panel 402 or a flanged ceramic panel 402, and an exostructure 404, which can be a non-ceramic exostructure 404. The exostructure 404 can include a first side 412, an exostructure extended side 414, and a recessed section 416.

The first side 412 can include recessed sections 416 on opposite sides of the first side 412. The recessed sections 416 can be in a direction opposite and on sides adjacent the extended sides 414. Exostructure extended sides 414 can protrude orthogonally from opposite edges of the first side 412. For illustrative purposes, the exostructure extended side 414 is shown with a planar surface orthogonal to the first side 412 although it is understood that it may be of any shape, size, or configuration.

The panel 402 can be attached to a mounting surface of the exostructure 404. The shelved cutout 418 can serve as the mounting surface for the panel 402 attached or fastened within the exostructure 404 providing a rigid integrated assembly. The fastening can include adhesives, friction fit, interference fit, fasteners, other methods of mechanical fixation, or combination thereof.

For example, the exostructure extended side 418 on an upper side and a lower side of the exostructure 404 can create a shape of a step up from the first side 412, and the recessed sections 416 on a left side and a right side of the exostructure 404 can create a shape of a step down from the first side 412.

The exostructure 404 is shown in a plan view 420. For illustrative purposes, the plan view 420 of the exostructure 404 is shown with a planar surface although it is understood that it may be different. For example, the exostructure 404 may be of any shape or configuration and can include any shape feature.

The exostructure 404 is shown in a side view 430. For illustrative purposes, the side view 430 of the exostructure 404 is shown with a planar surface although it is understood that it may be different. For example, the exostructure 404 may be of any shape or configuration and can include any shape feature.

The exostructure 404 is shown in a top view 440. For illustrative purposes, the top view 440 of the exostructure 404 is shown with a planar surface although it is understood that it may be different. For example, the exostructure 404 may be of any shape or configuration and can include any shape feature.

The exostructure 404 is shown in a first cross-sectional view 450 taken along line A-A. For illustrative purposes, the first cross-sectional view 450 of the exostructure 404 is shown with planar surfaces and a panel, such as the panel 102 of FIG. 1, although it is understood that it may be different. For example, the exostructure 404 may be of any shape or configuration and can include any shape feature.

The exostructure 404 is shown in a second cross-sectional view 460 taken along line B-B. For illustrative purposes, the second cross-sectional view 460 of the exostructure 404 is shown with planar surfaces although it is understood that it may be different. For example, the exostructure 404 may be of any shape or configuration and can include any shape feature.

Figure 5:
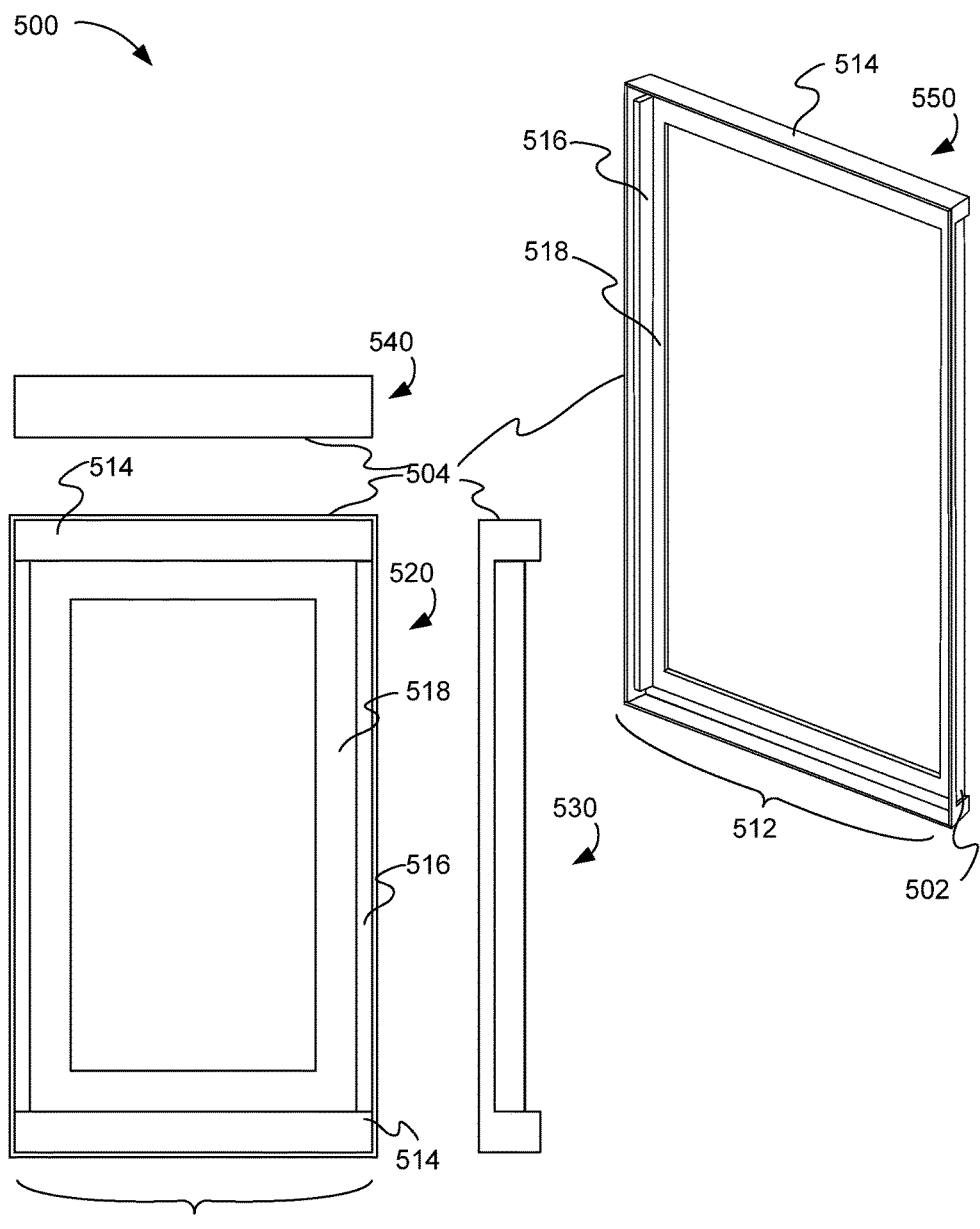
FIG. 5 is alternate views of a package system with cover structure in an embodiment of the present invention.

Referring now to FIG. 5, therein is shown alternate views of a package system 500 with cover structure in an embodiment of the present invention. Similar to the package system 100 of FIG. 1, the package system 500 includes a panel 502, which can be a ceramic panel 502 or a flanged ceramic panel 502, and an exostructure 504, which can be a non-ceramic exostructure 504.

The panel 502 can be attached to a mounting surface of the exostructure 504. The exostructure 504 can include a first side 512, an exostructure extended side 514, a recessed section 516, and a shelved cutout 518. The recessed section 516, the shelved cutout 518, or combination thereof can serve as the mounting surface for the panel 502.

Exostructure extended sides 514 can protrude orthogonally from opposite edges of the first side 512. For illustrative purposes, the exostructure extended side 514 is shown with a planar surface orthogonal to the first side 512 although it is understood that it may be of any shape, size, or configuration.

The first side 512 can include recessed sections 516 on opposite sides of the first side 512. The recessed sections 516 can be offset from the shelved cutout 518 in a direction opposite and on sides adjacent the exostructure extended sides 514.

For example, the exostructure extended side 514 on an upper side and a lower side of the exostructure 504 can create a shape of a step up from the shelved cutout 518, and the recessed sections 516 on a left side and a right side of the exostructure 504 can create a shape of a step down from the shelved cutout 518.

The exostructure 504 is shown in a plan view 520. For illustrative purposes, the plan view 520 of the exostructure 504 is shown with a planar surface although it is understood that it may be different. For example, the exostructure 504 may be of any shape or configuration and can include any shape feature.

The exostructure 504 is shown in a side view 530. For illustrative purposes, the side view 530 of the exostructure 504 is shown with a planar surface although it is understood that it may be different. For example, the exostructure 504 may be of any shape or configuration and can include any shape feature.

The exostructure 504 is shown in a top view 540. For illustrative purposes, the top view 540 of the exostructure 504 is shown with a planar surface although it is understood that it may be different. For example, the exostructure 504 may be of any shape or configuration and can include any shape feature.

The exostructure 504 is shown in an isometric view 550. For illustrative purposes, the isometric view 550 of the exostructure 504 is shown with a planar surface although it is understood that it may be different. For example, the exostructure 504 may be of any shape or configuration and can include any shape feature.

Figure 6:
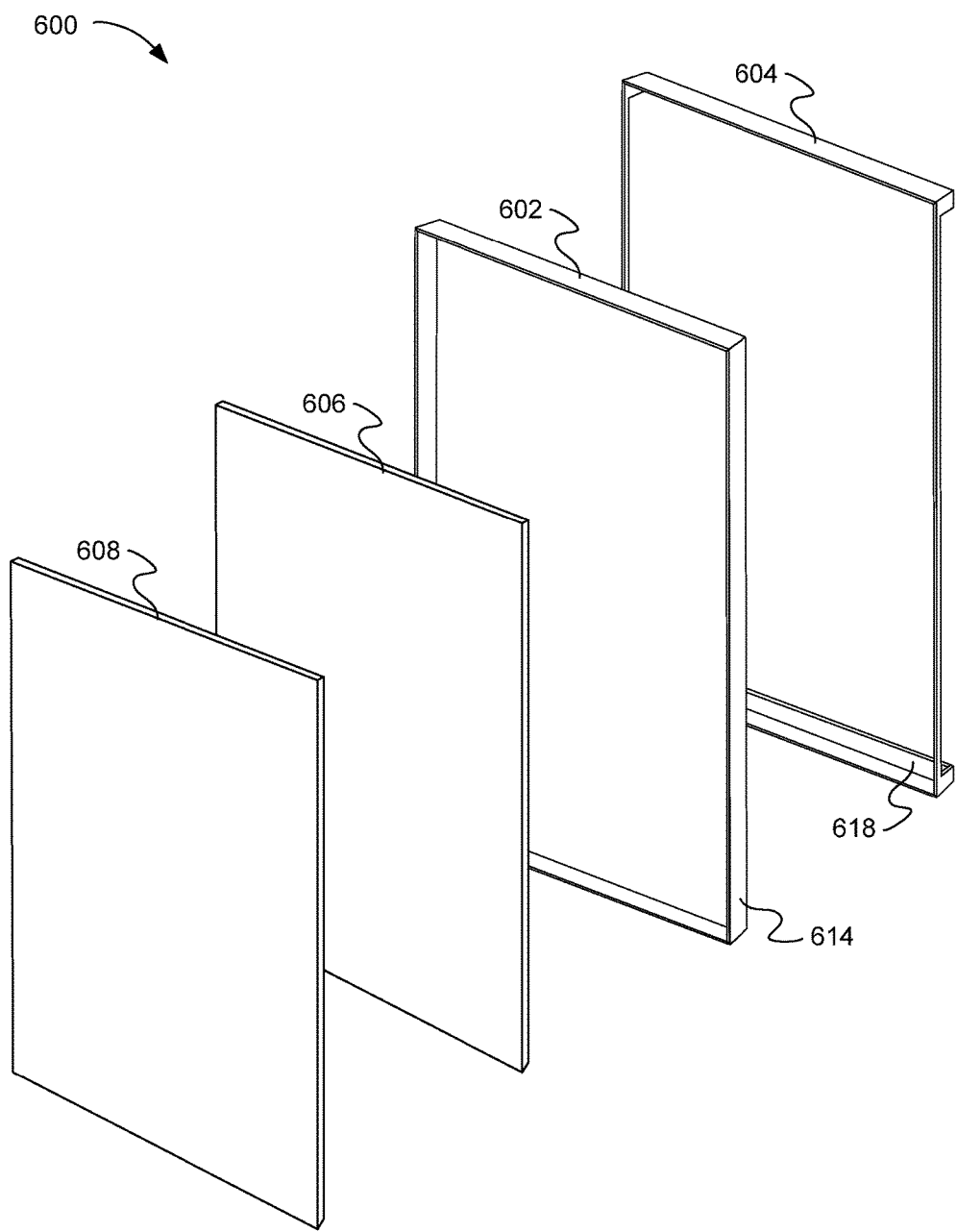
FIG. 6 is an expanded view of a package system with cover structure in an embodiment of the present invention.

Referring now to FIG. 6, therein is shown an expanded view of a package system 600 with cover structure in an embodiment of the present invention. The package system 600 includes a panel 602, which can be a ceramic panel 602 or a full flanged ceramic panel 602, an exostructure 604, which can be a non-ceramic exostructure 604, a shear panel 606, and a cover 608, which can be a cover glass 608.

The panel 602 can include a panel extended side 614 such as a flange 614. The panel extended side 614 can extend or protrude on opposite edges of the panel 602 or all four edges of the panel 602 forming a full flange panel 602. For illustrative purposes the panel extended side 614 is shown with a planar surface extending orthogonally from the panel 602 although it is understood that the panel extended side 614 may have any angle, shape, size, or configuration.

For example, the package system 600 can be assembled with the ceramic panel 602 attached or fastened to a shelved cutout 618 on the exostructure 604. The shear panel 606 can provide torsional support or integrity for the packaging system, and the glass cover 608, which can be load bearing or non-load bearing, can provide protection for device components of a device such as a handset.

For illustrative purposes the panel 602, the exostructure 604, the shear panel 606, and the cover 608 are shown with planar surfaces although it is understood that they may be different. For example, the exostructure 604, the shear panel 606, the cover 608, or combination thereof can include shape features, such as openings or cutouts, for buttons, connectors, optics, sensors, other functions, or combination thereof.

The package system 600 can include the non-ceramic exostructure 604 constructed such that any flat plane such as an impact plane coming in contact with the handset will always intersect the exostructure 604 first before contacting or preventing contact with the panel 602. The ceramic panel 602 can be mechanically fastened within the exostructure 604 providing a rigid integrated assembly. The fastening can include adhesives, friction fit, interference fit, fasteners, other methods of mechanical fixation, or combination thereof.

It has been discovered that the package system 600 can cover a portion of all sides of the panel 602 such as a full flanged ceramic panel 602 to restrict contact with the ceramic panel 602 and the impact plane during an impact event. The exostructure 604 can contact the impact plane first before the impact plane contacts the panel 602.

Figure 7:
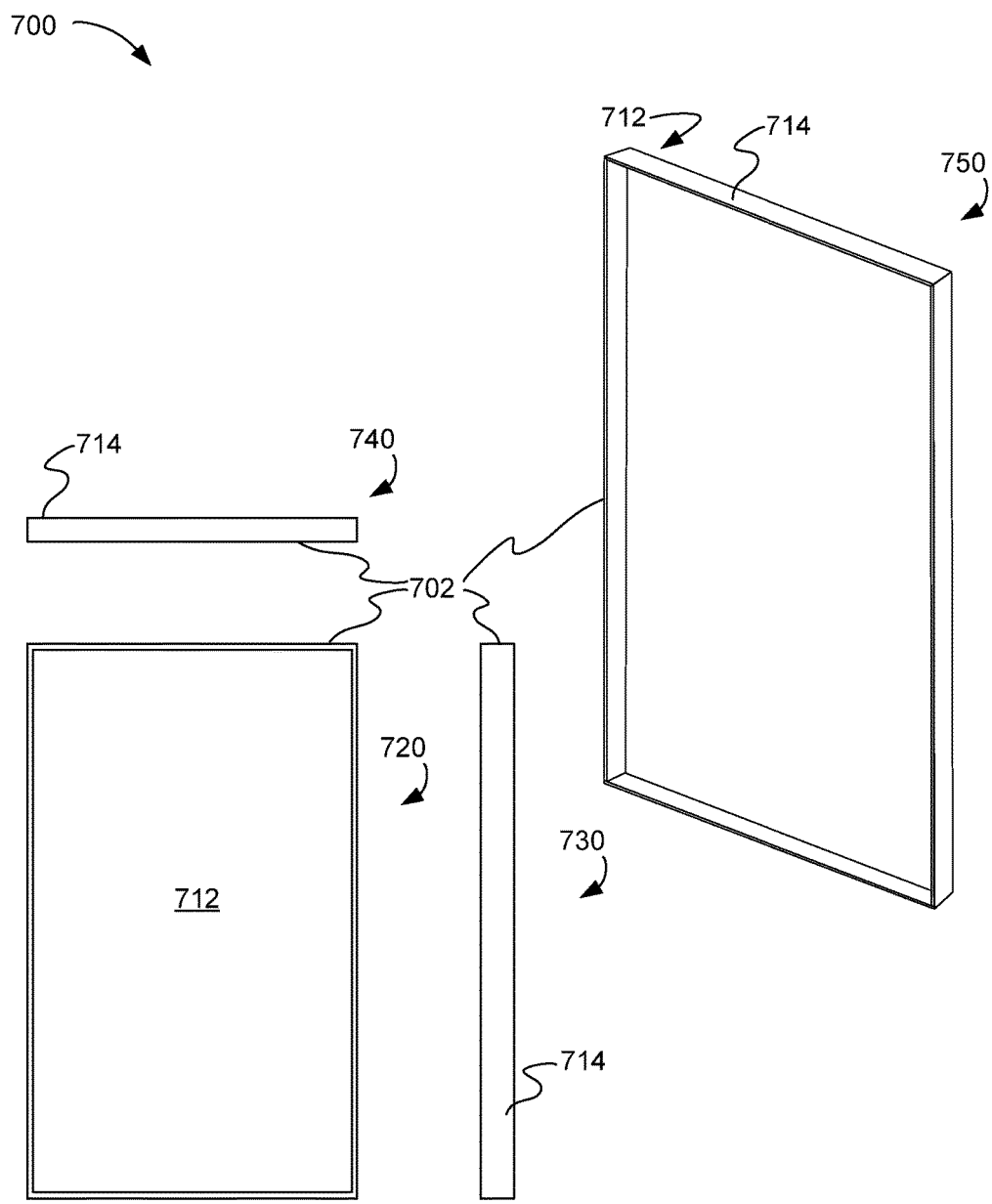
FIG. 7 is alternate views of a component of a package system with cover structure in an embodiment of the present invention . . . .

Referring now to FIG. 7, therein is shown alternate views of a component of a package system 700 with cover structure in an embodiment of the present invention. Similar to the package system 600 of FIG. 6, the package system 700 includes a panel 702, which can be a ceramic panel 702 or a full flanged ceramic panel 702. The panel 702 can include a first side 712 and a panel extended side 714.

Panel extended sides 714 can protrude orthogonally from all four edges of the first side 712. For illustrative purposes, the panel extended side 714 is shown with a planar surface orthogonal to the first side 712 although it is understood that it may be of any shape, size, or configuration.

The panel 702 is shown in a plan view 720. For illustrative purposes, the plan view 720 of the panel 702 is shown with a planar surface although it is understood that it may be different. For example, the panel 702 may be of any shape or configuration and can include any shape feature.

The panel 702 is shown in a side view 730. For illustrative purposes, the side view 730 of the panel 702 is shown with a planar surface although it is understood that it may be different. For example, the panel 702 may be of any shape or configuration and can include any shape feature.

The panel 702 is shown in a top view 740. For illustrative purposes, the front view 740 of the panel 702 is shown with a planar surface although it is understood that it may be different. For example, the panel 702 may be of any shape or configuration and can include any shape feature.

The panel 702 is shown in an isometric view 750. For illustrative purposes, the front view 750 of the panel 702 is shown with a planar surface although it is understood that it may be different. For example, the panel 702 may be of any shape or configuration and can include any shape feature.

Figure 8:
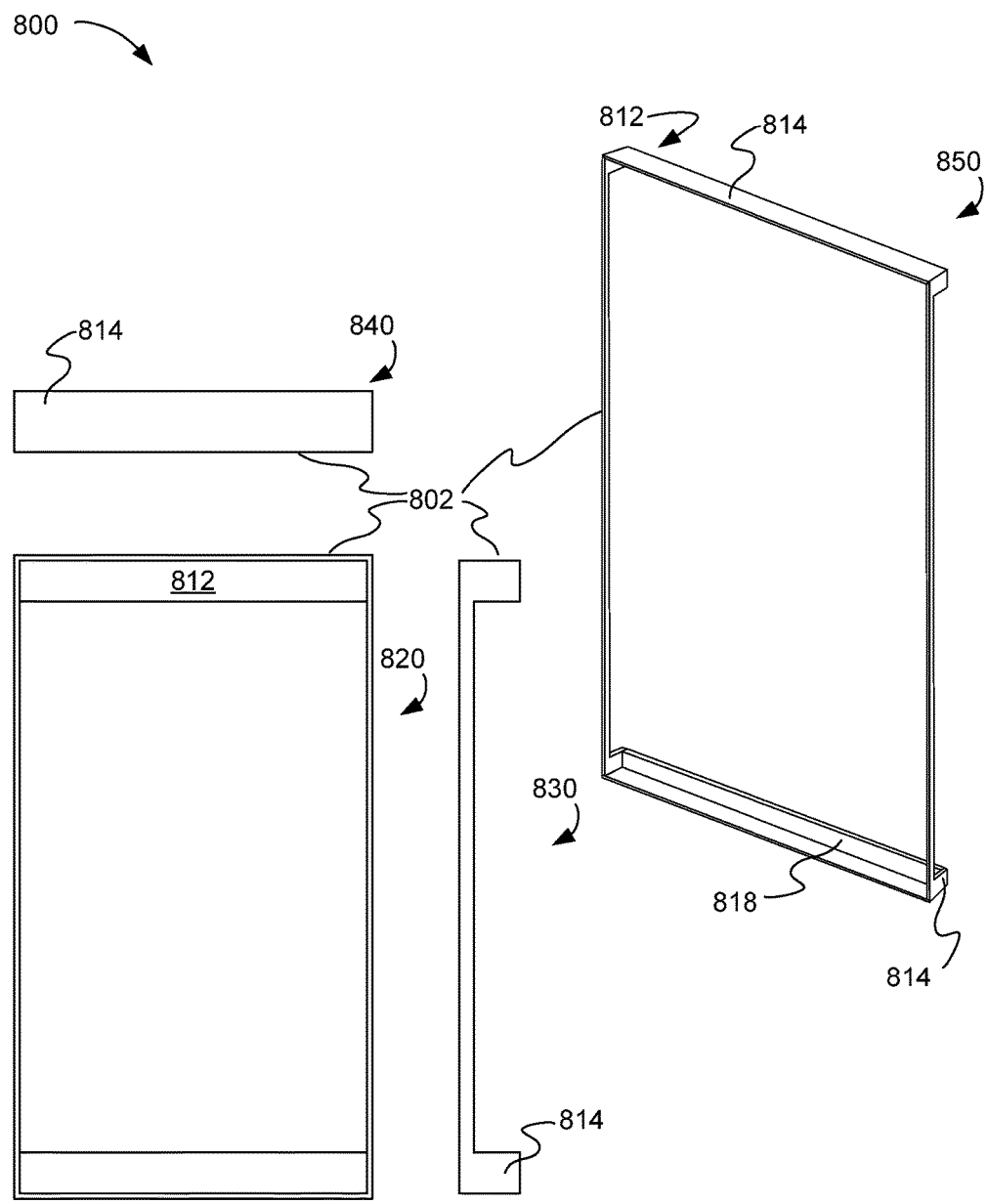
FIG. 8 is alternate views of a component of a package system with cover structure in an embodiment of the present invention.

Referring now to FIG. 8, therein is shown alternate views of a component of a package system 800 with cover structure in an embodiment of the present invention. Similar to the package system 600 of FIG. 6, the package system 800 includes an exostructure 804 such as a non-ceramic exostructure 804. The exostructure 804 can include a first side 812, an exostructure extended side 814, and a shelved cutout 818.

Exostructure extended sides 814 can protrude orthogonally from opposite edges of the first side 812. For illustrative purposes, the exostructure extended side 814 is shown with a planar surface orthogonal to the first side 812 although it is understood that it may be of any shape, size, or configuration.

A ceramic panel such as the ceramic panel 702 can be attached or fastened to the shelved cutout 818 and within the exostructure 804 providing a rigid integrated assembly. The fastening can include adhesives, friction fit, interference fit, fasteners, other methods of mechanical fixation, or combination thereof.

The exostructure 804 is shown in a plan view 820. For illustrative purposes, the plan view 820 of the exostructure 804 is shown with a planar surface although it is understood that it may be different. For example, the exostructure 804 may be of any shape or configuration and can include any shape feature.

The exostructure 804 is shown in a side view 830. For illustrative purposes, the side view 830 of the exostructure 804 is shown with a planar surface although it is understood that it may be different. For example, the exostructure 804 may be of any shape or configuration and can include any shape feature.

The exostructure 804 is shown in a top view 840. For illustrative purposes, the top view 840 of the exostructure 804 is shown with a planar surface although it is understood that it may be different. For example, the exostructure 804 may be of any shape or configuration and can include any shape feature.

The exostructure 804 is shown in an isometric view 850. For illustrative purposes, the isometric view 850 of the exostructure 804 is shown with a planar surface although it is understood that it may be different. For example, the exostructure 804 may be of any shape or configuration and can include any shape feature.

Figure 9:
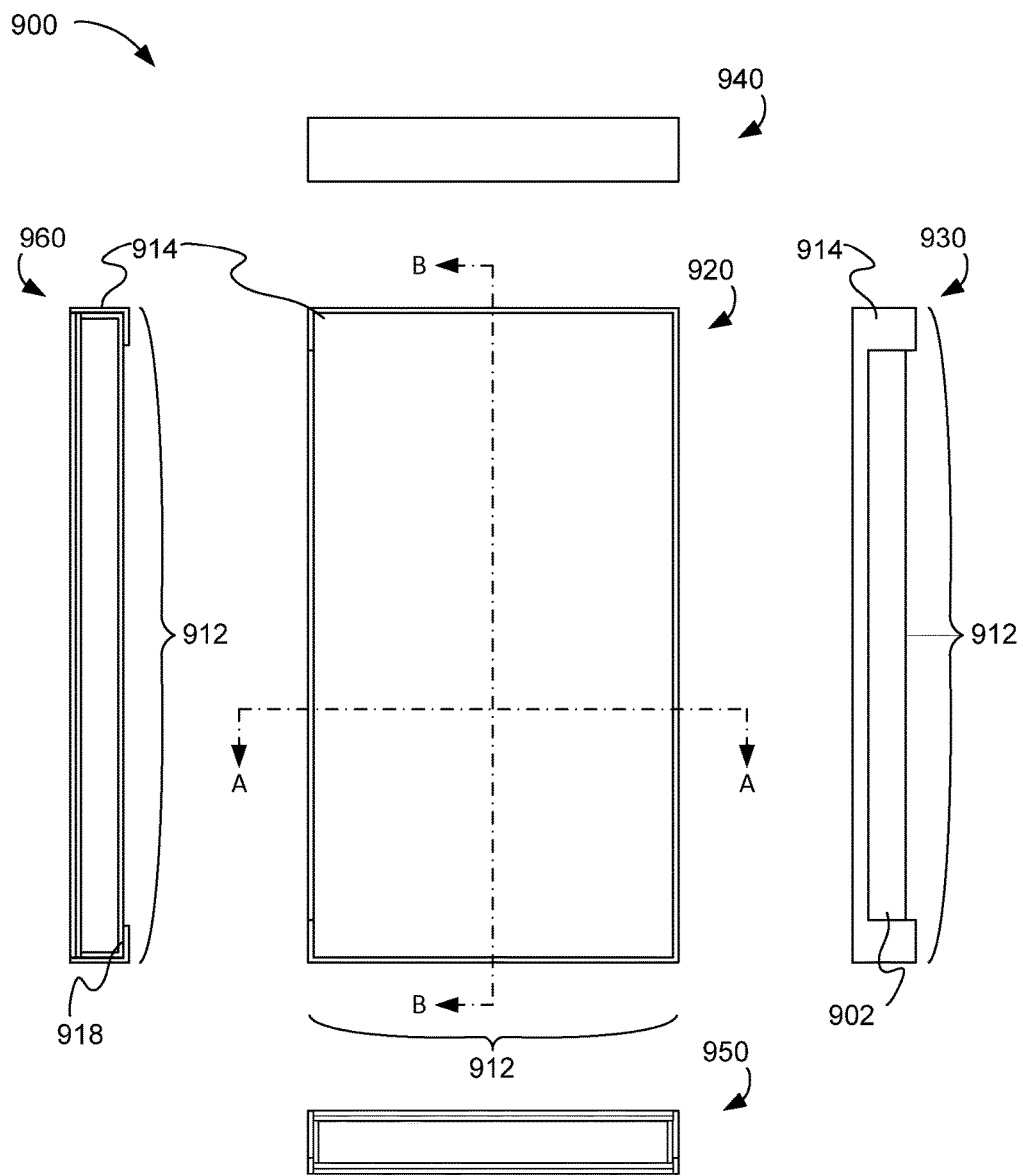
FIG. 9 is alternate views of a package system with cover structure in an embodiment of the present invention.

Referring now to FIG. 9, therein is shown alternate views of a package system 400 with cover structure in an embodiment of the present invention. Similar to the package system 600 of FIG. 6, the package system 900 includes a panel 902, which can be a ceramic panel 902 or a full flange ceramic panel 902 and an exostructure 904 such as a non-ceramic exostructure 904. The exostructure 904 can include a first side 912, an exostructure extended side 914, and a shelved cutout 918.

Exostructure extended sides 914 can protrude orthogonally from opposite edges of the first side 912. For illustrative purposes, the exostructure extended side 914 is shown with a planar surface orthogonal to the first side 912 although it is understood that it may be of any shape, size, or configuration.

The panel 902 can be attached to a mounting surface of the exostructure 904. The shelved cutout 918 can serve as the mounting surface for the panel 902 attached or fastened within the exostructure 904 providing a rigid integrated assembly. The fastening can include adhesives, friction fit, interference fit, fasteners, other methods of mechanical fixation, or combination thereof.

The exostructure 904 is shown in a plan view 920. For illustrative purposes, the plan view 920 of the exostructure 904 is shown with a planar surface although it is understood that it may be different. For example, the exostructure 904 may be of any shape or configuration and can include any shape feature.

The exostructure 904 is shown in a side view 930. For illustrative purposes, the side view 930 of the exostructure 904 is shown with a planar surface although it is understood that it may be different. For example, the exostructure 904 may be of any shape or configuration and can include any shape feature.

The exostructure 904 is shown in a top view 940. For illustrative purposes, the top view 940 of the exostructure 904 is shown with a planar surface although it is understood that it may be different. For example, the exostructure 904 may be of any shape or configuration and can include any shape feature.

The exostructure 904 is shown in a first cross-sectional view 950 taken along line A-A. For illustrative purposes, the first cross-sectional view 950 of the exostructure 904 is shown with planar surfaces and the panel 902, although it is understood that it may be different. For example, the exostructure 904 may be of any shape or configuration and can include any shape feature.

The exostructure 904 is shown in a second cross-sectional view 960 taken along line B-B. For illustrative purposes, the second cross-sectional view 960 of the exostructure 904 is shown with planar surfaces although it is understood that it may be different. For example, the exostructure 904 may be of any shape or configuration and can include any shape feature.

Figure 10:
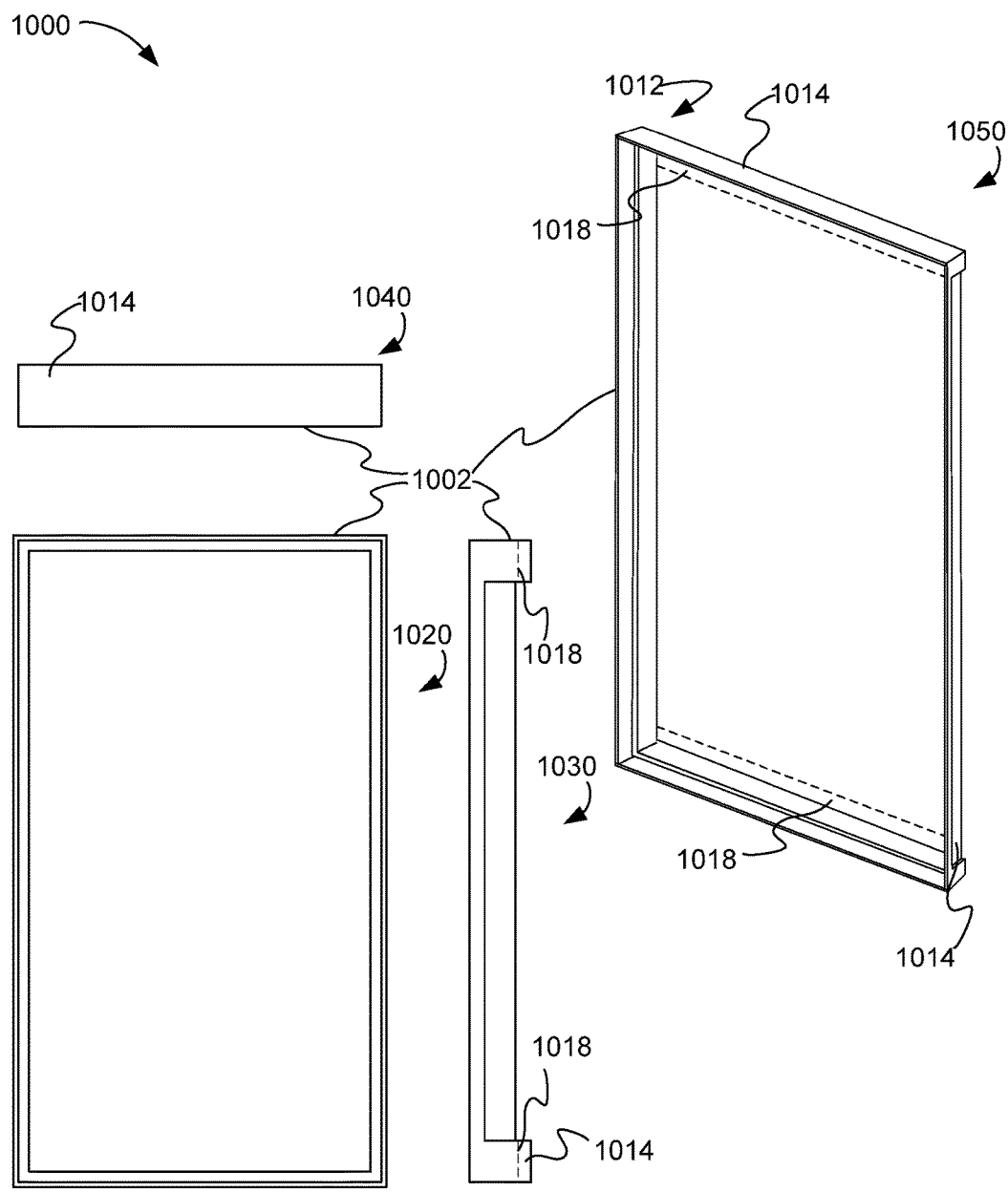
FIG. 10 is alternate views of a package system with cover structure in an embodiment of the present invention.

Referring now to FIG. 10, therein is shown alternate views of a package system 1000 with cover structure in an embodiment of the present invention. Similar to the package system 600 of FIG. 6, the package system 1000 includes a panel 1002, which can be a ceramic panel 1002 or a flanged ceramic panel 1002, and an exostructure 1004, which can be a non-ceramic exostructure 1004.

The exostructure 1004 can include a first side 1012, an exostructure extended side 1014, and a shelved cutout 1018 shown with hidden lines. Exostructure extended sides 1014 can protrude orthogonally from opposite edges of the first side 1012. For illustrative purposes, the exostructure extended side 1014 is shown with a planar surface orthogonal to the first side 1012 although it is understood that it may be of any shape, size, or configuration.

The panel 1002 can be attached to a mounting surface of the exostructure 1004. The shelved cutout 1018 can serve as the mounting surface for the panel 1002 attached or fastened within the exostructure 1004 providing a rigid integrated assembly. The fastening can include adhesives, friction fit, interference fit, fasteners, other methods of mechanical fixation, or combination thereof.

The exostructure 1004 is shown in a plan view 1020. For illustrative purposes, the plan view 1020 of the exostructure 1004 is shown with a planar surface although it is understood that it may be different. For example, the exostructure 1004 may be of any shape or configuration and can include any shape feature.

The exostructure 1004 is shown in a side view 1030. For illustrative purposes, the side view 1030 of the exostructure 1004 is shown with a planar surface although it is understood that it may be different. For example, the exostructure 1004 may be of any shape or configuration and can include any shape feature.

The exostructure 1004 is shown in a top view 1040. For illustrative purposes, the top view 1040 of the exostructure 1004 is shown with a planar surface although it is understood that it may be different. For example, the exostructure 1004 may be of any shape or configuration and can include any shape feature.

The exostructure 1004 is shown in an isometric view 1050. For illustrative purposes, the isometric view 1050 of the exostructure 1004 is shown with a planar surface although it is understood that it may be different. For example, the exostructure 1004 may be of any shape or configuration and can include any shape feature.

Figure 11:
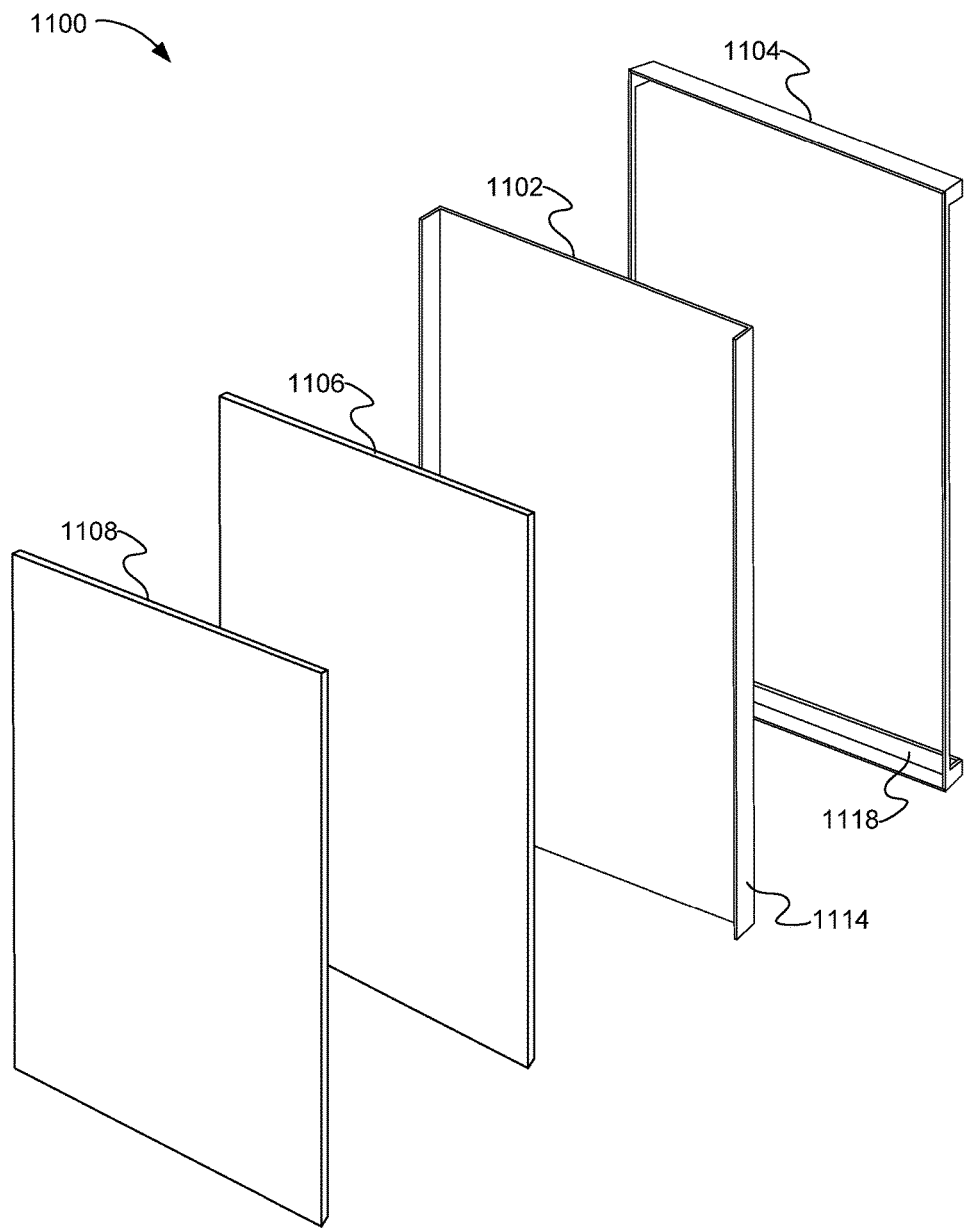
FIG. 11 is an expanded view of a package system with cover structure in an embodiment of the present invention.

Referring now to FIG. 11, therein is shown an expanded view of a package system 1100 with cover structure in an embodiment of the present invention. The package system 1100 includes a panel 1102, which can be a ceramic panel 1102 or a flanged ceramic panel 1102, an exostructure 1104, which can be a non-ceramic exostructure 1104, a shear panel 1106, and a cover 1108, which can be a cover glass 1108.

The panel 1102 can include a panel extended side 1114 such as a flange 114. The panel extended side 1114 can extend or protrude on opposite edges of the panel 1102 forming a partial flange panel 1102. For illustrative purposes the panel extended side 1114 is shown with a planar surface extending orthogonally from the panel 1102 although it is understood that the panel extended side 1114 may have any angle, shape, size, or configuration.

For example, the package system 1100 can be assembled with the ceramic panel 1102 attached or fastened to a shelved cutout 1118 on the exostructure 1104. The shear panel 1106 can provide torsional support or integrity for the packaging system, and the glass cover 1108, which can be load bearing or non-load bearing, can provide protection for device components of a device such as a handset.

For illustrative purposes the panel 1102, the exostructure 1104, the shear panel 1106, and the cover 1108 are shown with planar surfaces although it is understood that they may be different. For example, the exostructure 1104, the shear panel 1106, the cover 1108, or combination thereof can include shape features, such as openings or cutouts, for buttons, connectors, optics, sensors, other functions, or combination thereof.

The package system 1100 can include the non-ceramic exostructure 1104 constructed such that any flat plane such as an impact plane coming in contact with the handset will always intersect the exostructure 1104 first before contacting or preventing contact with the panel 1102. The ceramic panel 1102 can be mechanically fastened within the exostructure 1104 providing a rigid integrated assembly. The fastening can include adhesives, friction fit, interference fit, fasteners, other methods of mechanical fixation, or combination thereof.

It has been discovered that the package system 1100 can cover a portion of all sides of the panel 1102 such as a partial flanged ceramic panel 1102 to restrict contact with the ceramic panel 1102 and the impact plane during an impact event. The exostructure 1104 can contact the impact plane first before the impact plane contacts the panel 1102.

Figure 12:
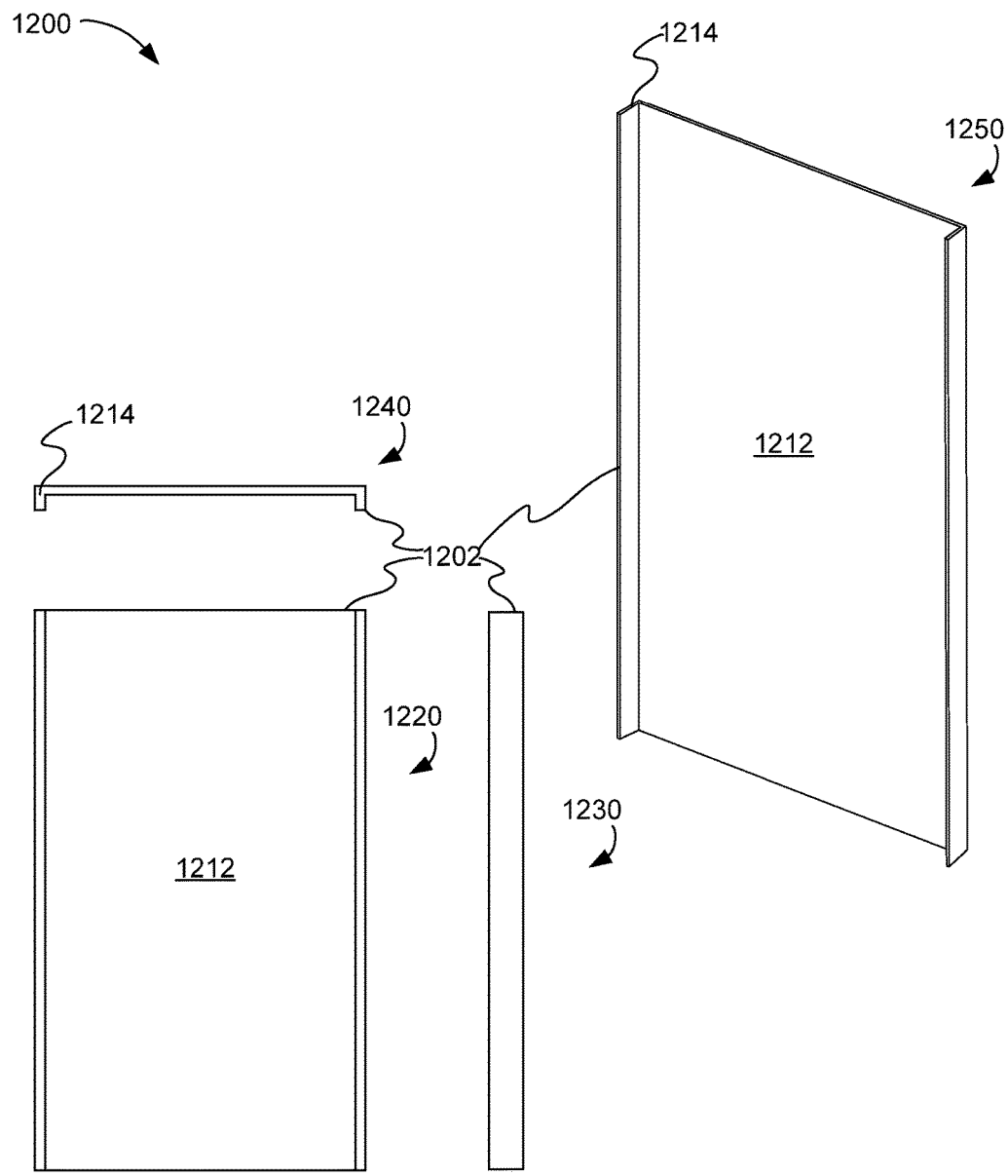
FIG. 12 is alternate views of a component of a package system with cover structure in an embodiment of the present invention.

Referring now to FIG. 12, therein is shown alternate views of a component of a package system 200 with cover structure in an embodiment of the present invention. Similar to the package system 1100 of FIG. 11, the package system 1200 includes a panel 1202, which can be a ceramic panel 1202. The panel 1202 can include a panel first side 1212 and a panel extended side 1214.

Panel extended sides 1214 can protrude orthogonally from opposite edges of the first side 1212 forming a partial flange panel 1102. For illustrative purposes, the panel extended side 1214 is shown with a planar surface orthogonal to the first side 1212 although it is understood that the panel extended side 1214 may be of any angle, shape, size, or configuration.

The panel 1202 is shown in a plan view 1220. For illustrative purposes, the plan view 1220 of the panel 1202 is shown with a planar surface although it is understood that it may be different. For example, the panel 1202 may be of any shape or configuration and can include any shape feature.

The panel 1202 is shown in a side view 1230. For illustrative purposes, the side view 1230 of the panel 1202 is shown with a planar surface although it is understood that it may be different. For example, the panel 1202 may be of any shape or configuration and can include any shape feature.

The panel 1202 is shown in a top view 1240. For illustrative purposes, the front view 1240 of the panel 1202 is shown with a planar surface although it is understood that it may be different. For example, the panel 1202 may be of any shape or configuration and can include any shape feature.

The panel 1202 is shown in an isometric view 1250. For illustrative purposes, the front view 1250 of the panel 1202 is shown with a planar surface although it is understood that it may be different. For example, the panel 1202 may be of any shape or configuration and can include any shape feature.

Figure 13:
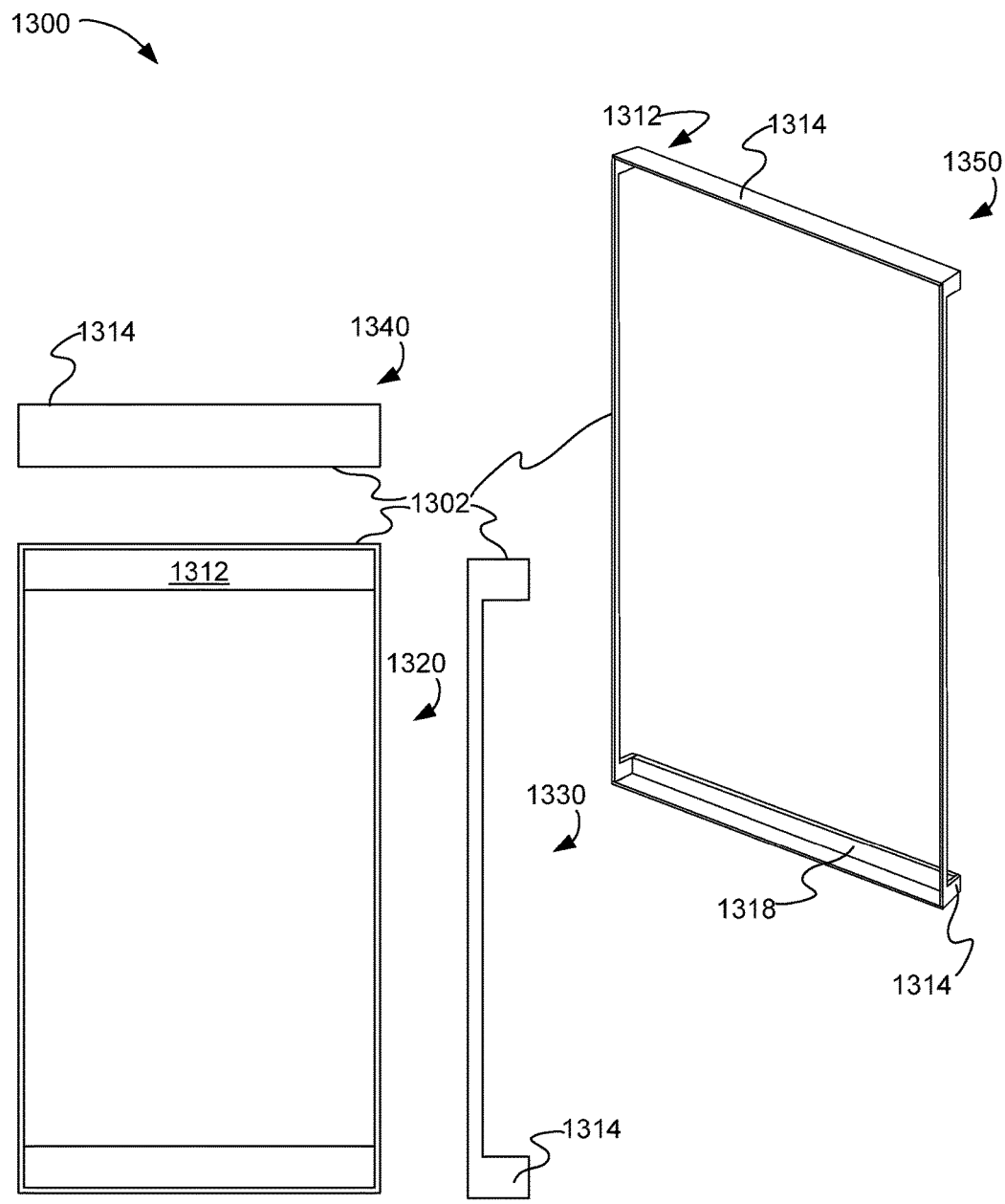
FIG. 13 is alternate views of a component of a package system with cover structure in an embodiment of the present invention.

Referring now to FIG. 13, therein is shown alternate views of a component of a package system 800 with cover structure in an embodiment of the present invention. Similar to the package system 1100 of FIG. 11, the package system 1300 includes an exostructure 1304 such as a non-ceramic exostructure 1304. The exostructure 1304 can include a first side 1312, an exostructure extended side 1314, and a shelved cutout 1318.

Exostructure extended sides 1314 can protrude orthogonally from opposite edges of the first side 1312. For illustrative purposes, the exostructure extended side 1314 is shown with a planar surface orthogonal to the first side 1312 although it is understood that it may be of any shape, size, or configuration.

A ceramic panel such as the ceramic panel 1202 can be attached or fastened to the shelved cutout 1318 and within the exostructure 1304 providing a rigid integrated assembly. The fastening can include adhesives, friction fit, interference fit, fasteners, other methods of mechanical fixation, or combination thereof.

The exostructure 1304 is shown in a plan view 1320. For illustrative purposes, the plan view 1320 of the exostructure 1304 is shown with a planar surface although it is understood that it may be different. For example, the exostructure 1304 may be of any shape or configuration and can include any shape feature.

The exostructure 1304 is shown in a side view 1330. For illustrative purposes, the side view 1330 of the exostructure 1304 is shown with a planar surface although it is understood that it may be different. For example, the exostructure 1304 may be of any shape or configuration and can include any shape feature.

The exostructure 1304 is shown in a top view 1340. For illustrative purposes, the top view 1340 of the exostructure 1304 is shown with a planar surface although it is understood that it may be different. For example, the exostructure 1304 may be of any shape or configuration and can include any shape feature.

The exostructure 1304 is shown in an isometric view 1350. For illustrative purposes, the isometric view 1350 of the exostructure 1304 is shown with a planar surface although it is understood that it may be different. For example, the exostructure 1304 may be of any shape or configuration and can include any shape feature.

Figure 14:
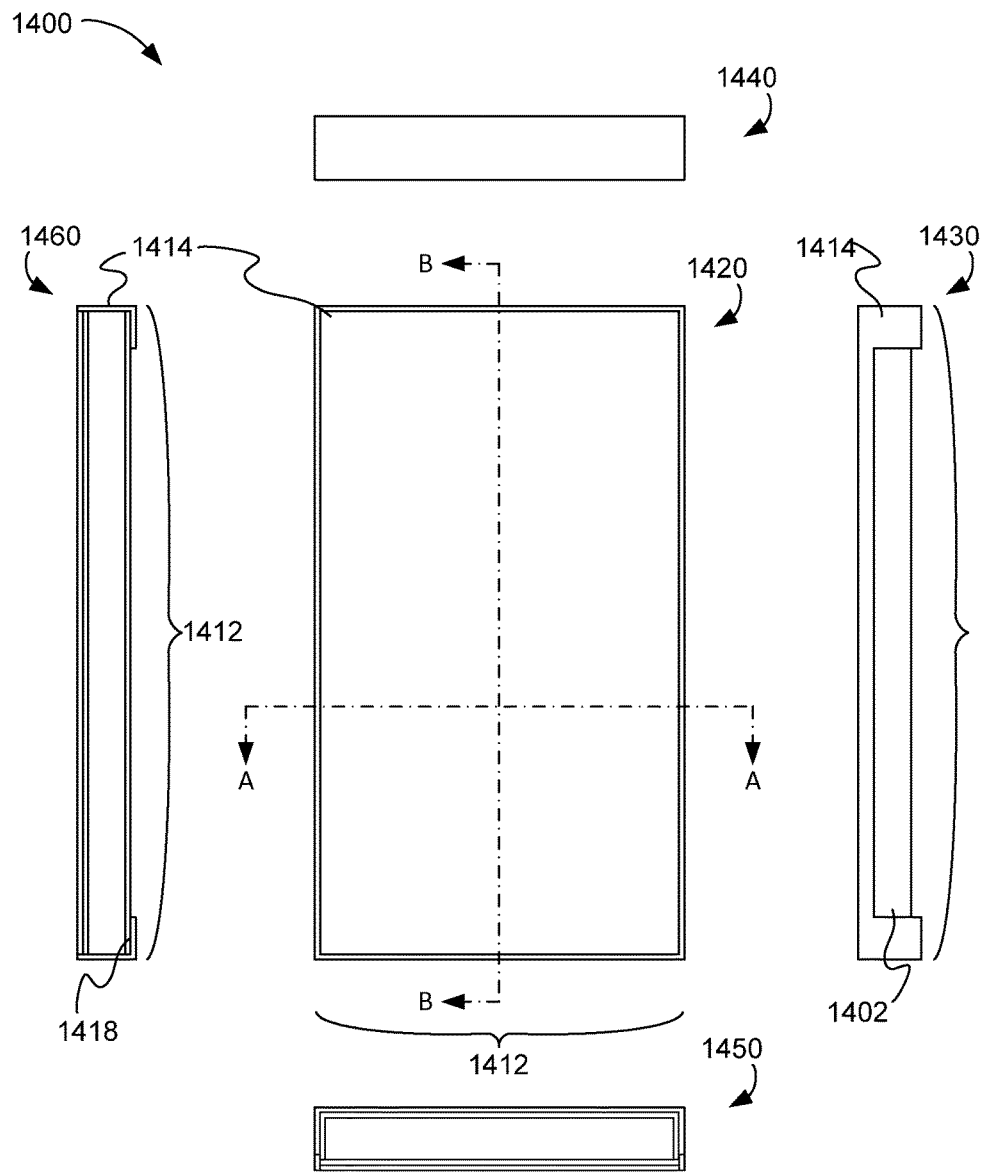
FIG. 14 is alternate views of a package system with cover structure in an embodiment of the present invention.

Referring now to FIG. 14, therein is shown alternate views of a package system 400 with cover structure in an embodiment of the present invention. Similar to the package system 1100 of FIG. 11, the package system 1400 includes a panel 1402, which can be a ceramic panel 1402 or a partial flange ceramic panel 1402 and an exostructure 1404 such as a non-ceramic exostructure 1404. The exostructure 1404 can include a first side 1412, an exostructure extended side 1414, and a shelved cutout 1418.

Exostructure extended sides 1414 can protrude orthogonally from opposite edges of the first side 1412. For illustrative purposes, the exostructure extended side 1414 is shown with a planar surface orthogonal to the first side 1412 although it is understood that it may be of any shape, size, or configuration.

The panel 1402 can be attached to a mounting surface of the exostructure 1404. The shelved cutout 1418 can serve as the mounting surface for the panel 1402 attached or fastened within the exostructure 1404 providing a rigid integrated assembly. The fastening can include adhesives, friction fit, interference fit, fasteners, other methods of mechanical fixation, or combination thereof.

The exostructure 1404 is shown in a plan view 1420. For illustrative purposes, the plan view 1420 of the exostructure 1404 is shown with a planar surface although it is understood that it may be different. For example, the exostructure 1404 may be of any shape or configuration and can include any shape feature.

The exostructure 1404 is shown in a side view 1430. For illustrative purposes, the side view 1430 of the exostructure 1404 is shown with a planar surface although it is understood that it may be different. For example, the exostructure 1404 may be of any shape or configuration and can include any shape feature.

The exostructure 1404 is shown in a top view 1440. For illustrative purposes, the top view 1440 of the exostructure 1404 is shown with a planar surface although it is understood that it may be different. For example, the exostructure 1404 may be of any shape or configuration and can include any shape feature.

The exostructure 1404 is shown in a first cross-sectional view 1450 taken along line A-A. For illustrative purposes, the first cross-sectional view 1450 of the exostructure 1404 is shown with planar surfaces and the panel 1402, although it is understood that it may be different. For example, the exostructure 1404 may be of any shape or configuration and can include any shape feature.

The exostructure 1404 is shown in a second cross-sectional view 1460 taken along line B-B. For illustrative purposes, the second cross-sectional view 1460 of the exostructure 1404 is shown with planar surfaces although it is understood that it may be different. For example, the exostructure 1404 may be of any shape or configuration and can include any shape feature.

Figure 15:
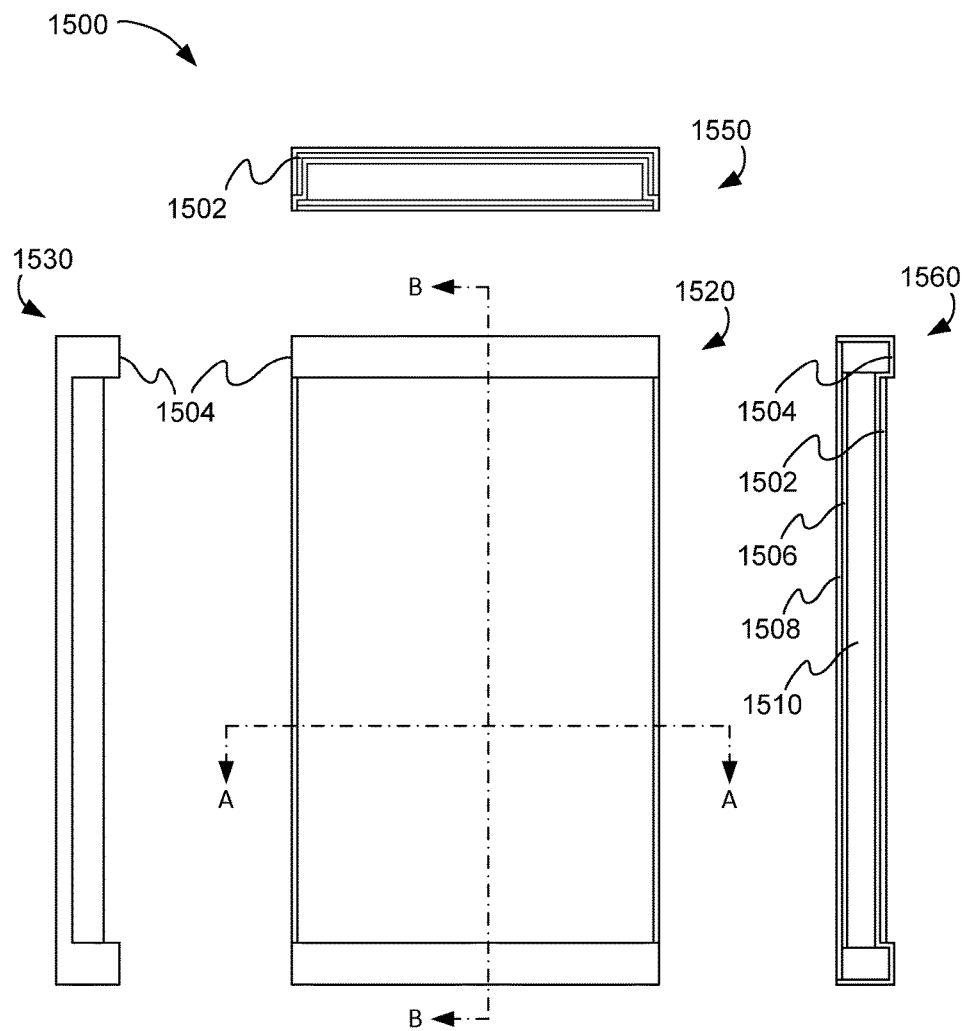
FIG. 15 is alternate views of a package system with cover structure in an embodiment of the present invention.

Referring now to FIG. 15, therein is shown alternate views of a package system 1500 with cover structure in an embodiment of the present invention. Similar to the package system 100 of FIG. 1, the package system 1500 includes a panel 1502, which can be ceramic panel 1502 or a flanged ceramic panel 1502, an exostructure 1504, which can be a metal frame 1504, a shear panel 1506, and a cover 1508, which can be a cover glass 1508.

The package system 1500 can also include internal device components 1510 or an internal component volume 1510 in the exostructure 1504 and the panel 1502. The internal device components 1510 can include circuitry or device components for a device such as a handset or hand held computing device. The package system 1500 with the panel 1502 and the exostructure 1504 can provide a housing architecture for housing and protecting the internal device components 1510 of the handset or hand held computing device.

The package system 1500 is shown in a plan view 1520. For illustrative purposes, the plan view 1520 of the package system 1500 is shown with planar surfaces although it is understood that it may be different. For example, the exostructure 1504 may be of any shape or configuration and can include any shape feature.

The package system 1500 is shown in a side view 1530. For illustrative purposes, the side view 1530 of the package system 1500 is shown with planar surfaces although it is understood that it may be different. For example, the exostructure 1504 may be of any shape or configuration and can include any shape feature.

The package system 1500 is shown in a first cross-sectional view 1550 taken along line A-A. For illustrative purposes, the first cross-sectional view 1550 of the package system 1500 is shown with planar surfaces, although it is understood that it may be different. For example, the panel 1502 may be of any shape or configuration and can include any shape feature.

The package system 1500 is shown in a second cross-sectional view 1560 taken along line B-B. For illustrative purposes, the second cross-sectional view 1560 of the package system 1500 is shown with planar surfaces although it is understood that it may be different. For example, the panel 1502 may be of any shape or configuration and can include any shape feature.

Figure 16:
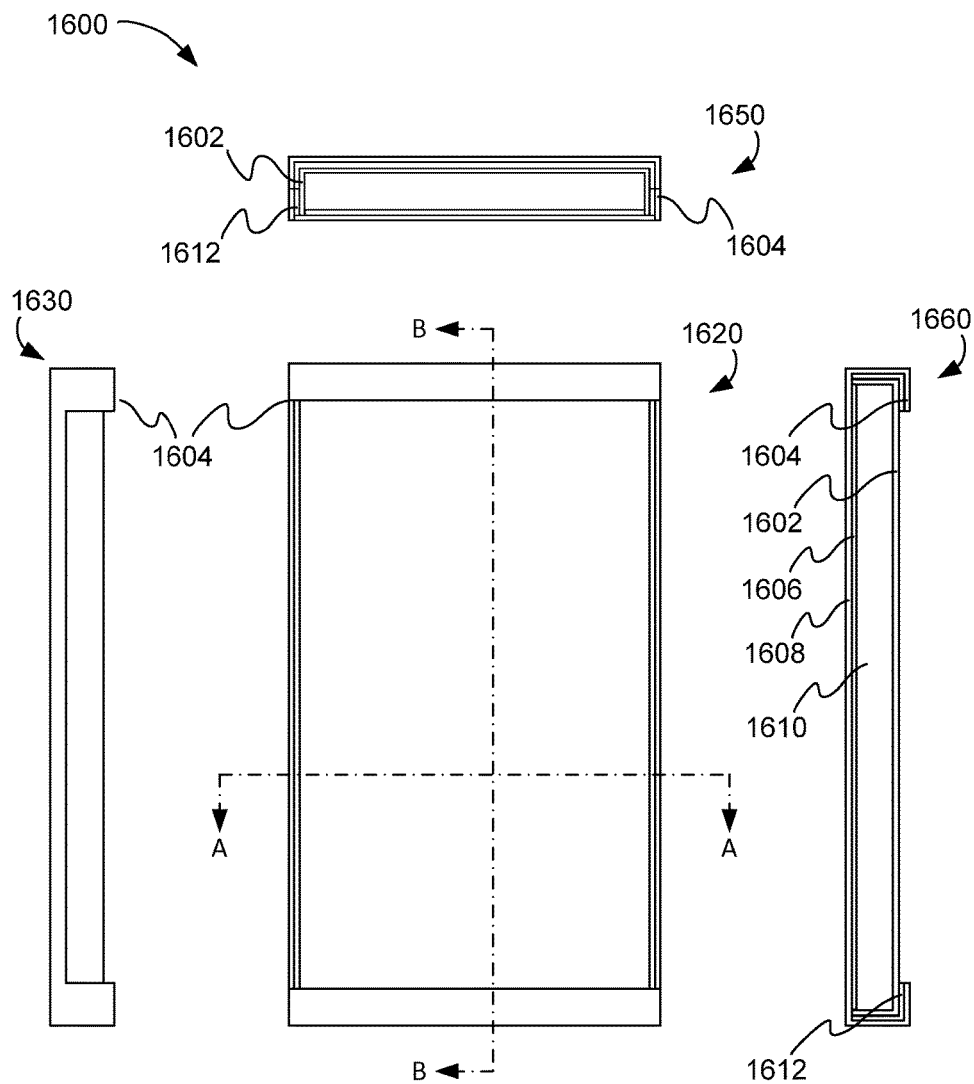
FIG. 16 is alternate views of a package system with cover structure in an embodiment of the present invention.

Referring now to FIG. 16, therein is shown alternate views of a package system 1600 with cover structure in an embodiment of the present invention. The package system 1600 includes a panel 1602, which can be a ceramic panel 1602 or a flanged ceramic panel 1602, an exostructure 1604, which can be a metal frame 1604, a shear panel 1606, and a cover 1608, which can be a cover glass 1608.

The package system 1600 can also include internal device components 1610 or an internal component volume 1610 in the exostructure 1604 and the panel 1602. The internal device components 1610 can include circuitry or device components for a device such as a handset or hand held computing device. The package system 1600 with the panel 1602 and the exostructure 1604 can provide a housing architecture for housing and protecting the internal device components 1610 of the handset or hand held computing device. A gap, inset, or offset between the panel 1602 and the outer edge of the exostructure 1604 restricts contact with the panel 1602 and an impact plane during an impact event.

Optionally, an energy absorbing layer 1612 such as an energy absorbing gasket 1612 can be included between the panel 1602 and the exostructure 1604 to reduce a force transmission rate for a peak load during an impact event. The energy absorbing layer 1612 can have a hardness greater than or equal to 60 A durometer based on a Shore Type A scale for providing additional impact protection.

The package system 1600 is shown in a plan view 1620. For illustrative purposes, the plan view 1620 of the package system 1600 is shown with planar surfaces although it is understood that it may be different. For example, the exostructure 1604 may be of any shape or configuration and can include any shape feature.

The package system 1600 is shown in a side view 1630. For illustrative purposes, the side view 1630 of the package system 1600 is shown with planar surfaces although it is understood that it may be different. For example, the exostructure 1604 may be of any shape or configuration and can include any shape feature.

The package system 1600 is shown in a first cross-sectional view 1650 taken along line A-A. For illustrative purposes, the first cross-sectional view 1650 of the package system 1600 is shown with planar surfaces, although it is understood that it may be different. For example, the panel 1602 may be of any shape or configuration and can include any shape feature.

The package system 1600 is shown in a second cross-sectional view 1660 taken along line B-B. For illustrative purposes, the second cross-sectional view 1660 of the package system 1600 is shown with planar surfaces although it is understood that it may be different. For example, the panel 1602 may be of any shape or configuration and can include any shape feature. Further, the exostructure 1604 is shown forming an outer frame along the outer edge of the ceramic panel.

It has been discovered that the package system 1600 with the energy absorbing layer 1612 between the panel 1602 and the exostructure 1604 provides significantly reduced force transmission rates. The significantly reduced force transmission rates provide additional impact protection for the ceramic panel 1602.

It has also been discovered that the package system 1600 including the energy absorbing layer 1612 between the panel 1602 and the exostructure 1604 provides significantly reduced force transmission rates with the energy absorbing layer 1612 having a hardness greater than or equal to 60 A durometer.

Figure 17:
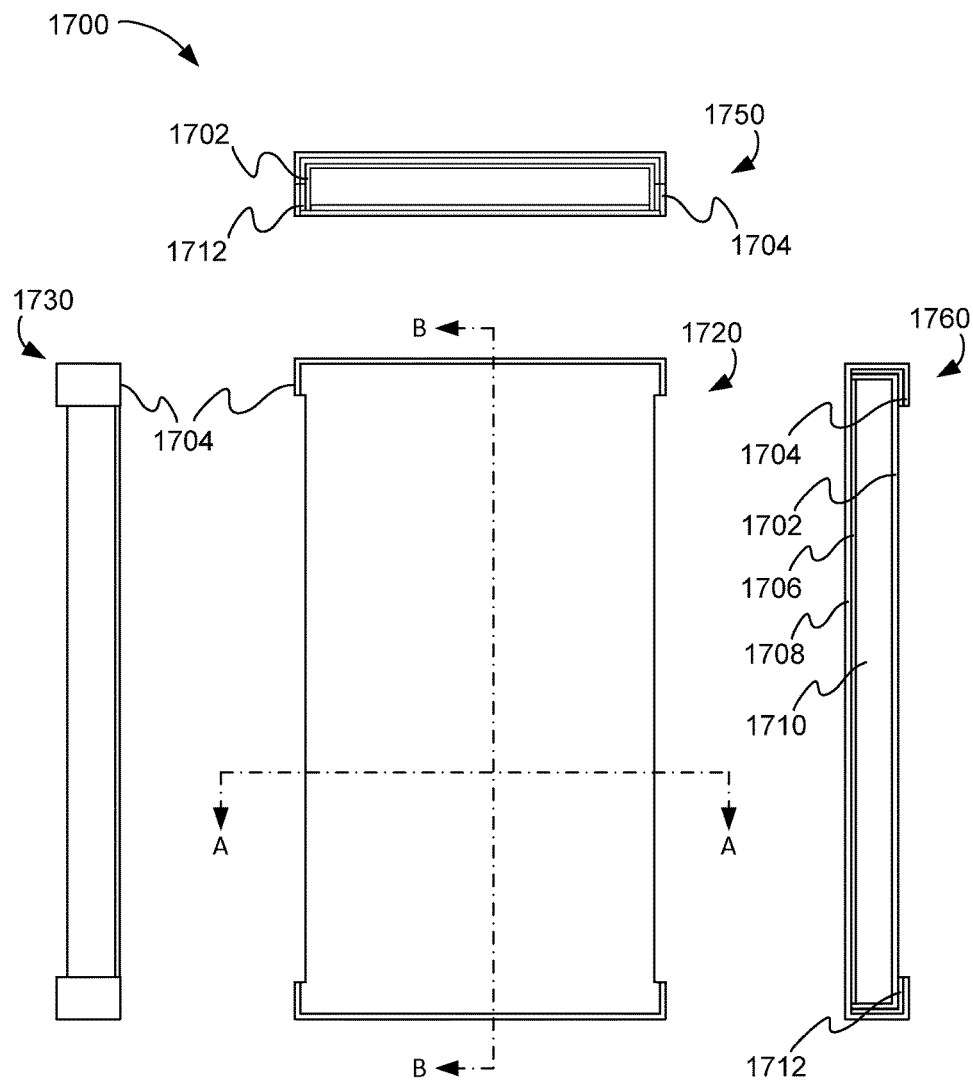
FIG. 17 is alternate views of a package system with cover structure in an embodiment of the present invention.

Referring now to FIG. 17, therein is shown alternate views of a package system 1700 with cover structure in an embodiment of the present invention. The package system 1700 includes a panel 1702, which can be a ceramic panel 1702 or a flanged ceramic panel 1702, an exostructure 1704, which can be a metal frame 1704, a shear panel 1706, and a cover 1708, which can be a cover glass 1708.

The package system 1700 can also include internal device components 1710 or an internal component volume 1710 in the exostructure 1704 and the panel 1702. The internal device components 1710 can include circuitry or device components for a device such as a handset or hand held computing device. The package system 1700 with the panel 1702 and the exostructure 1704 can provide a housing architecture for housing and protecting the internal device components 1710 of the handset or hand held computing device. A gap, inset, or offset between the panel 1702 and the outer edge of the exostructure 1704 restricts contact with the panel 1702 and an impact plane during an impact event.

The exostructure 1704 covers only ends or corners of the panel 1702. A high stiffness of the panel 1702 attached to the exostructure 1704 maintains the gap, inset, or offset between the panel 1702 and the outer edge of the exostructure 1704. The high stiffness of the panel 1702 and the gap, inset, or offset to the exostructure 1704 attached to the panel 1702 prevents contact with the panel 1702 and an impact plane during an impact event.

Optionally, an energy absorbing layer 1712 such as an energy absorbing gasket 1712 can be included between the panel 1702 and the exostructure 1704 to reduce a force transmission rate for a peak load during an impact event. The energy absorbing layer 1712 can have a hardness greater than or equal to 60 A durometer based on a Shore Type A scale for providing additional impact protection.

The package system 1700 is shown in a plan view 1720. For illustrative purposes, the plan view 1720 of the package system 1700 is shown with planar surfaces although it is understood that it may be different. For example, the exostructure 1704 may be of any shape or configuration and can include any shape feature.

The package system 1700 is shown in a side view 1730. For illustrative purposes, the side view 1730 of the package system 1700 is shown with planar surfaces although it is understood that it may be different. For example, the exostructure 1704 may be of any shape or configuration and can include any shape feature.

The package system 1700 is shown in a first cross-sectional view 1750 taken along line A-A. For illustrative purposes, the first cross-sectional view 1750 of the package system 1700 is shown with planar surfaces, although it is understood that it may be different. For example, the panel 1702 may be of any shape or configuration and can include any shape feature.

The package system 1700 is shown in a second cross-sectional view 1760 taken along line B-B. For illustrative purposes, the second cross-sectional view 1760 of the package system 1700 is shown with planar surfaces although it is understood that it may be different. For example, the panel 1702 may be of any shape or configuration and can include any shape feature.

It has been discovered that the package system 1700 with the exostructure 1704 covering only ends or corners of the panel 1702 prevents contact with the panel 1702 and an impact plane during an impact event. The high stiffness of the panel 1702 maintains the gap, inset, or offset between the panel 1702 and the outer edge of the exostructure 1704 prevents contact with the panel 1702 and an impact plane during an impact event.

Figure 18:
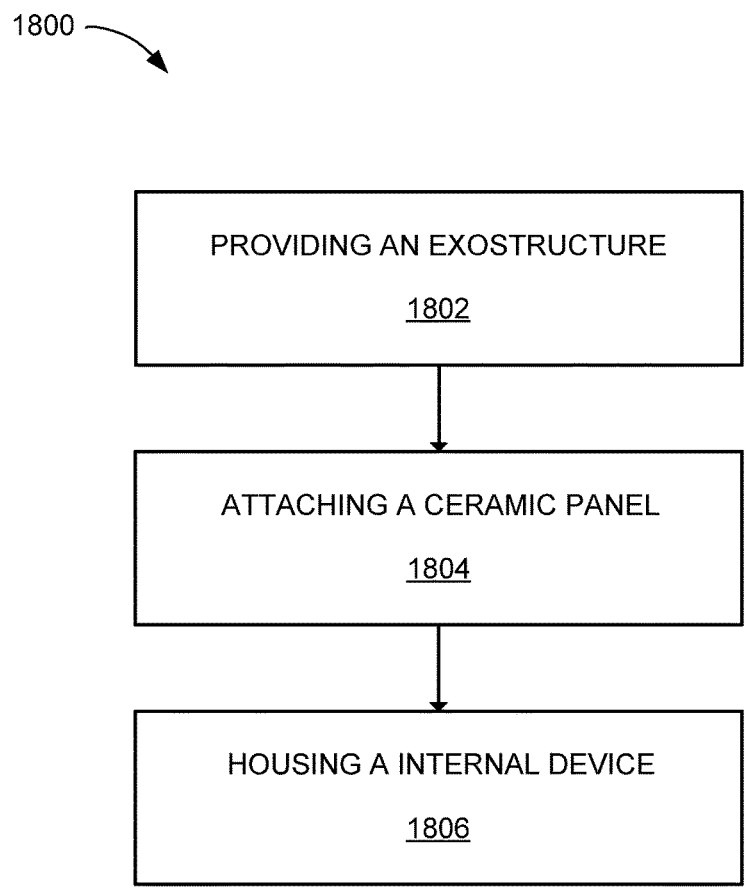
FIG. 18 is a flow chart of a method of manufacture of a package system in an embodiment of the present invention.

Referring now to FIG. 18, therein is shown a flow chart of a method 1800 of operation of a package system 100 in an embodiment of the present invention. The method 1800 includes: providing an exostructure in a block 1802; attaching a ceramic panel to the exostructure in a block 1804; and housing an internal device component in the exostructure in a block 1806.

In an embodiment of the present invention, the package system 100 can restrict contact with the ceramic panel 102 and the impact plane during an impact event. The exostructure 104 can contact the impact plane first before the impact plane contacts the panel 102.

Also in an embodiment of the present invention, the package system 100 with the exostructure 104 can include an offset and an effective Young's modulus to restrict contact with the panel 102 the impact plane. The combination of the offset and the Young's modulus can prevent undue deformation in the integrated assembly of the exostructure 104 and panel 102.

Further in an embodiment of the present invention, the package system 600 can cover a portion of all sides of the panel 602 such as a full flanged ceramic panel 602 to restrict contact with the ceramic panel 602 and the impact plane during an impact event. The exostructure 604 can contact the impact plane first before the impact plane contacts the panel 602.

Yet further in an embodiment of the present invention, the package system 1100 can cover a portion of all sides of the panel 1102 such as a partial flanged ceramic panel 1102 to restrict contact with the ceramic panel 1102 and the impact plane during an impact event. The exostructure 1104 can contact the impact plane first before the impact plane contacts the panel 1102.

Yet further in an embodiment of the present invention, the package system 1600 with the energy absorbing layer 1612 between the panel 1602 and the exostructure 1604 provides significantly reduced force transmission rates. The significantly reduced force transmission rates provide additional impact protection for the ceramic panel 1602.

Yet further in an embodiment of the present invention, the package system 1600 including the energy absorbing layer 1612 between the panel 1602 and the exostructure 1604 provides significantly reduced force transmission rates with the energy absorbing layer 1612 having a hardness greater than or equal to 60 A durometer.

Yet further in an embodiment of the present invention, the package system 1700 with the exostructure 1704 covering only ends or corners of the panel 1702 prevents contact with the panel 1702 and an impact plane during an impact event. The high stiffness of the panel 1702 maintains the gap, inset, or offset between the panel 1702 and the outer edge of the exostructure 1704 prevents contact with the panel 1702 and an impact plane during an impact event.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A package system comprising:
   an exostructure for forming an outer frame, the exostructure including a first side, exostructure extended sides, recessed sections, and a shelved cutout, wherein:
   the exostructure extended sides protrude orthogonally from opposite edges of the first side to form a step up from the shelved cutout,
   the first side includes the recessed sections on opposite sides of the first side to form a step down in a direction opposite and on sides of the exostructure adjacent the exostructure extended sides;
   a ceramic panel attached to the exostructure, wherein the ceramic panel and the exostructure form an exterior housing cover for a hand held computing device; and
   an internal device component housed in the exostructure.

2. The system as claimed in claim 1 wherein the ceramic panel is a partial flange panel.

3. The system as claimed in claim 1 wherein the ceramic panel is a full flange panel.

4. The system as claimed in claim 1 wherein a side opposite a panel first side of the ceramic panel is attached to the exostructure.

5. The system as claimed in claim 1 wherein a panel first side of the ceramic panel is attached to the exostructure.

6. The system as claimed in claim 1 wherein the exostructure is a non-ceramic exostructure.

7. The system as claimed in claim 1 wherein the exostructure is metal.

8. The system as claimed in claim 1 further comprising a shear panel for providing torsional support attached to the exostructure.

9. The system as claimed in claim 1 further comprising a shear panel for providing torsional support attached to the ceramic panel.

10. The system as claimed in claim 1 further comprising an energy absorbing layer attached between the ceramic panel and the exostructure.

11. A method of manufacture of a package system comprising:
providing an exostructure for forming an outer frame, the exostructure including a first side, exostructure extended sides, recessed sections, and a shelved cutout, wherein:
the exostructure extended sides protrude orthogonally from opposite edges of the first side to form a step up from the shelved cutout,
the first side includes the recessed sections on opposite sides of the first side to form a step down in a direction opposite and on sides of the exostructure adjacent the exostructure extended sides;
attaching a ceramic panel to the exostructure, wherein the ceramic panel and the exostructure form an exterior housing cover for a hand held computing device; and
housing an internal device component in the exostructure.

12. The method as claimed in claim 11 wherein attaching a ceramic panel to the exostructure includes attaching a partial flange panel to the exostructure.

13. The method as claimed in claim 11 wherein attaching a ceramic panel to the exostructure includes attaching a full flange panel to the exostructure.

14. The method as claimed in claim 11 wherein attaching a ceramic panel to the exostructure includes attaching a side opposite a panel first side of the ceramic panel to the exostructure.

15. The method as claimed in claim 11 wherein attaching a ceramic panel to the exostructure includes attaching a panel first side of the ceramic panel to the exostructure.

16. The method as claimed in claim 11 wherein providing the exostructure includes providing a non-ceramic exostructure.

17. The method as claimed in claim 11 wherein providing the exostructure includes providing a metal exostructure.

18. The method as claimed in claim 11 further comprising attaching a shear panel for providing torsional support to the exostructure.

19. The method as claimed in claim 11 further comprising attaching a shear panel for providing torsional support to the ceramic panel.

20. The method as claimed in claim 11 further comprising attaching an energy absorbing layer between the ceramic panel and the exostructure.

* * * * *